US007254557B1

(12) United States Patent
Gillin et al.

(10) Patent No.: US 7,254,557 B1
(45) Date of Patent: Aug. 7, 2007

(54) FINANCIAL SERVICES PAYMENT VEHICLE AND METHOD

(75) Inventors: Matthew J. Gillin, Rosemont, PA (US); Roger Korfmann, Radnor, PA (US); Paul L. Raden, Phoenixville, PA (US)

(73) Assignee: C/Base, Inc., Conshohocken, PA (US)

( * ) Notice: Subject to any disclaimer, the term of this patent is extended or adjusted under 35 U.S.C. 154(b) by 0 days.

(21) Appl. No.: 09/302,218

(22) Filed: Apr. 29, 1999

Related U.S. Application Data

(63) Continuation-in-part of application No. 09/188,810, filed on Nov. 9, 1998.

(51) Int. Cl.
*G06Q 40/00* (2006.01)

(52) U.S. Cl. .......................................... 705/40; 705/35

(58) Field of Classification Search .................. 705/40, 705/26, 35

See application file for complete search history.

(56) References Cited

U.S. PATENT DOCUMENTS 4,305,059 A 12/1981 Benton
4,960,981 A 10/1990 Benton et al.
4,977,595 A 12/1990 Ohta et al.
5,276,736 A 1/1994 Chaum
5,373,558 A 12/1994 Chaum
5,420,926 A 5/1995 Low et al.
5,426,594 A 6/1995 Wright et al.
5,434,919 A 7/1995 Chaum
5,442,567 A 8/1995 Small
5,453,601 A 9/1995 Rosen
5,493,614 A 2/1996 Chaum
5,513,117 A 4/1996 Small
5,557,518 A 9/1996 Rosen (Continued)

OTHER PUBLICATIONS

International Search Report corresponding to PCT/US99/30830, dated May 16, 2000.

(Continued)

*Primary Examiner*—Vincent Millin
*Assistant Examiner*—Olabode Akintola
(74) *Attorney, Agent, or Firm*—Morgan & Finnegan LLP

(57) ABSTRACT

A financial services payment vehicle is disclosed having a database stored on a computer readable media, the database including records associated with a plurality of active financial services card accounts, one of the financial services card account records having a name representing a cardholder for purposes of using the account, the name having a first part selected by the cardholder and a second part selected by a second party unrelated to the cardholder.

A financial services method is also disclosed involving selecting a first part of a cardholder name for an account which would appear on a financial services card if a physical card is issued, accepting an unrelated entity's selection of a second part of the cardholder name for the account such that a use of the account will result in a provision of the first part in place of a first name and the second part in place of a surname.

An additional financial services method is disclosed involving a using step for making a purchase with a financial services card, the financial services card including a cardholder name having a first part selected in a first selecting step by an individual in whose name the financial services card is registered, and a second part selected in a second selecting step, the second part identifying an entity other than the individual.

60 Claims, 16 Drawing Sheets

U.S. PATENT DOCUMENTS

| | | | | | |
|---|---|---|---|---|---|
| 5,642,419 | A | | 6/1997 | Rosen | |
| 5,663,547 | A | | 9/1997 | Ziarno | |
| 5,671,279 | A | | 9/1997 | Elgamal | |
| 5,699,528 | A | * | 12/1997 | Hogan | 705/40 |
| 5,712,913 | A | | 1/1998 | Chaum | |
| 5,715,298 | A | * | 2/1998 | Rogers | 379/91.01 |
| 5,729,594 | A | | 3/1998 | Klingman | |
| 5,750,972 | A | | 5/1998 | Botvin | |
| 5,757,917 | A | | 5/1998 | Rose et al. | |
| 5,768,385 | A | | 6/1998 | Simon | |
| 5,781,631 | A | | 7/1998 | Chaum | |
| 5,796,841 | A | | 8/1998 | Cordery et al. | |
| 5,815,577 | A | | 9/1998 | Clark | |
| 5,815,657 | A | | 9/1998 | Williams et al. | |
| 5,842,185 | A | * | 11/1998 | Chancey et al. | 705/40 |
| 5,864,830 | A | | 1/1999 | Armetta et al. | |
| 5,875,437 | A | * | 2/1999 | Atkins | 705/40 |
| 5,884,288 | A | * | 3/1999 | Chang et al. | 705/40 |
| 5,893,080 | A | * | 4/1999 | McGurl et al. | 705/40 |
| 5,956,391 | A | * | 9/1999 | Melen et al. | 379/114.01 |
| 5,956,700 | A | * | 9/1999 | Landry | 705/40 |
| 6,032,133 | A | * | 2/2000 | Hilt et al. | 705/40 |
| 6,044,360 | A | | 3/2000 | Picciallo | |
| 6,078,907 | A | * | 6/2000 | Lamm | 705/40 |
| 6,081,790 | A | * | 6/2000 | Rosen | 705/40 |

OTHER PUBLICATIONS

Brands, S., "Electronic Cash on the Internet", Proceedings of the Internet Society 1995 Symposium on Network and Distributed System Security, Oct. 16, 1994, 21 pages.
Chaum, D., "Online Cash Checks", Centre for Mathematics and Computer Science http://ganges.cs.tcd.ie, 1993, 5 pages.
Chaum, D., "Prepaid Smart Card Techniques: A Brief Introduction and Comparison", http://ganges.cs.tcd.ie, 1994, 4 pages.
Crede, A., "Electronic Commerce and the Banking Industry: The Requirement and Opportunities for New Payment Systems Using the Internet", Science Policy Research Unit University of Sussex, www.ascusc.org, date unknown, 19 pages.
Crocker, S. et al., "Cybercash: Payments Systems for the Internet", www.isoc.org, 1995, 3 pages.
Furche, A., and Wrightson, G., "Computer Money: A Systematic Overview of Electronic Payment Systems", dpunkt—Verlag für Digitale Technologie, (pp. 25-33, 45-63), 1996.
Hansell S., "Got a Dime? Citibank and Chase End Test of Electronic Cash", *The New York Times*, Business day—C1, Nov. 4, 1998, 2 pages.
Hallam-Baker, P., "Electronic Payment Schemes", www.w3.org, 1998, 4 pages.
Holmes, P., "Gift Certificates For Premiums/Incentives #3060", Sales Marketing Network, www.info-now.com, 1998, 10 pages.
Holmes, P. "Debit Cards #3040 New Form of Incentive Explained", Sale Marketing Network, www.info-now.com, 1998, 4 pages.
Kalakota et al., "Readings in Electronic Commerce", http://ei.cs.vt.edu, 1997, 3 pages.
Klur, D., "What an Organization Should Know About Using Electronic Cash", Information Strategy, 1997, vol. 13, pp. 15-22.
Kristol et al., "Anonymous Internet Mercantile Protocol", AT&T Bell Laboratories, 1994, 16 pages.
Low, S. and Maxemchuk, N., "Anonymous Credit Cards", AT&T Bell Laboratories, 1994, 10 pages.
Lynch et al., "Digital Money" Chapter 2: Dramatis Personae, www.oit.iusb.edu, 2 pages, date unknown.
O' Mahony et al., "Electronic Payment Systems" Artech House, Inc., (pp. 65-71, 146-182, 191-238), 1997.
Peirce et al., "Network Payment Mechanisms and Digital Cash: Electronic Payment Systems", http://ganges.cs.tcd.ie, date unknown, 10 pages.
Peirce et al., "Scalable, Secure Cash payment for WWW Resources with the PayMe Protocol Set", http://ganges.cs.tcd.ie, 15 pages, date unknown.
Peirce et al., "Begin PGP Signed Message", http://ntrg.cs.tcd.ie/mepeirce, 4 pages, date unknown.
Van Bakel, R., "The Check is in the E-Mail-Digital Cash is Coming Faster Than You Think", *NetGuide* 1996, 4 pages.
Verdonk, Otten, Dik & Wiegerinck "Gepubliceerde Artikelen, Internet Payment Systems: An overview", www.vodw.nl/kennis/artikelen/art47.htm, date unknown, 10 pages.
Wolff, M., "Net Selling", *Forbes ASAP Supplement*, Aug. 28, 1995, pp. 30-32.
"A Quick Overview of E-Money, Plus Selected Links", Abracadabra, www.dabra.demon.co.uk, 10 pages, date unknown.
"ADV:!! Get YOUR anonymous Credit Card Now!!", from www.vma.bme.hu//lla/1998/Feb/msg00679.html>, 1998, 2 pages.
American Express Incentive Services, www.aeis.com, 1998, 5 pages.
"Anonymous Secured MasterCard Credit Card", www.offshore-manual.com/cp11.htm.>., date unknown, 4 pages.
BarclayCoin, "Questions and Answers, Wallet", www.barclaycoin.co.uk, date unknown, 2 pages.
"Cash Poor", Section: Survey; Electronic Commerce, *The Economist*, 1997, 3 pages.
"CyberCash and Barclays Bank Announces BarclayCoin Service", PRNewswire, 1997, 2 pages.
Card Express, Inc "The Future of Gifts and Incentives", www.cardex.com, 2 pages, 1998.
CardEx GiftCard, www.cardex.com, 3 pages, 1998.
CardTrak Online "Blockbuster Develops Electronic GiftCard For Video, Music Discovery Zone", www.ramresearch.com, Jan. 15, 1996, 2 pages.
College Enterprises, Inc. "Special Teams", www.college-enterprises.com, date unknown, 2 pages.
Cybank Funds Transfer, www.cybank.net, date unknown, 2 pages.
"EFT's Final Frontier: Payments Over The Internet", Bank Network News, 1995, 2 pages.
"Electronic Commerce of Component Information (ECCI) Program, White Paper", www.sandia.gov, date unknown, 5 pages.
"Electronic Commerce Subject Notes Second Semester, 1997", Department of Information Systems, The University of Melbourne, www.dis.unimelb.edu, Sep. 2, 1997, 17 pages.
"Electronic Cash", www.admin@www.cs.sandia.gov, date unknown, 1 page.
e-gold, "Questions and Answers", www.e-gold.com, date unknown, 11 pages.
"Gift Certificate Express", www.cardex.com, 1998, 6 pages.
"Gift Certificates", www.catalogsite.com, 1995/'96/'97, 4 pages.
"1-800-Gift Certificate"; www.800giftcertificate.com, date unknown, 2 pages.
"Groups SET On Securing Internet Sales", *Debit Card News*, Feb. 27, 1998, 2 pages.
"Internet Electronic Cash", www.dialanerd.com, date unknown, 2 pages.
"Investigate the Professional Issues Raised by Current Business Interest in Exploiting the Internet and the WWW for Electronic Commerce.", www.csc.liv.ac.uk, date unknown, 6 pages.
"Mondex on the Internet", www.mondex.com, 1998, 1 page.
"NetFare", www.netfare.com, 1995, 4 pages.
"Offshore Credit Cards", www.ul.net/~offshore/cc.htm>., date unknown, 5 pages.
Online Check Systems, "The Check's In The Net", www.onlinecheck.com, date unknown, 3 pages.
"Privacyworld Anonymous Credit Card Program" www.privacyworld.com, 1998, 3 pages.
"Privacyworld Lifeline Rechargeable ATM/Mastercard plus Anonymous Bank Account!" www.privacyworld.com, 1998, 5 pages.
"Selected Presentations and Publications", www.ccs.neu.edu, 1998, 3 pages.
"24/7 Ticket Service", www.webticket.com, date unknown, 1 page.
"Unisource In Agreement with Belgium's Banksys on Electronic Payment Systems", *AFX-Europe*, 1997, 1 page.

* cited by examiner

FIG. 1
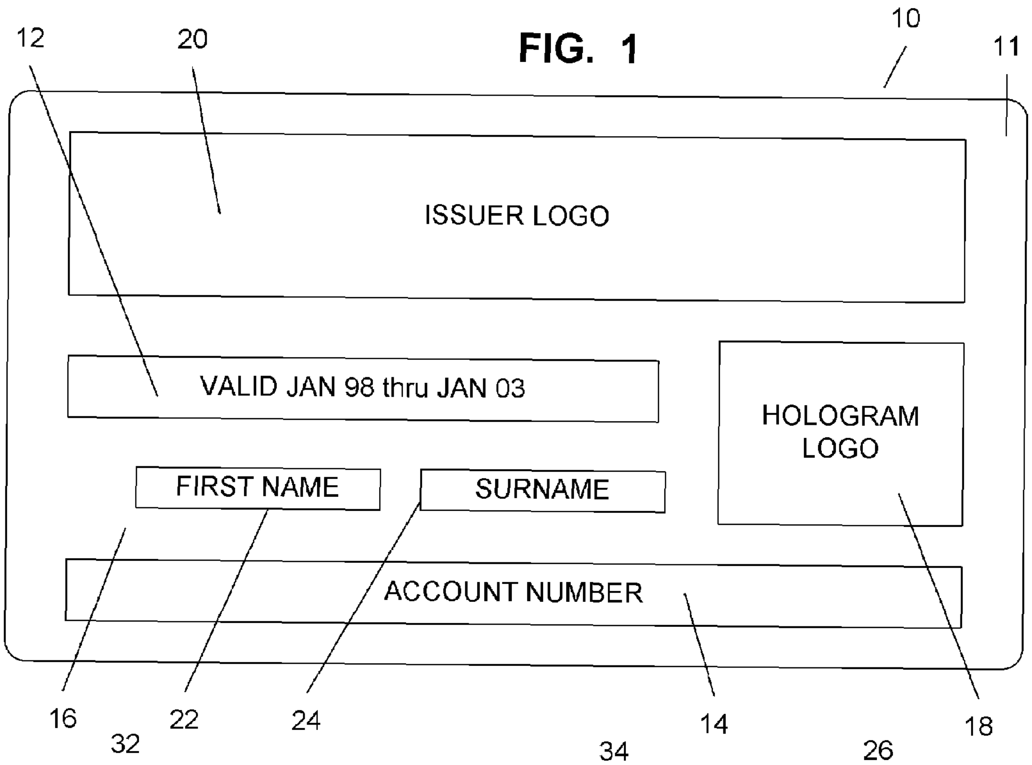
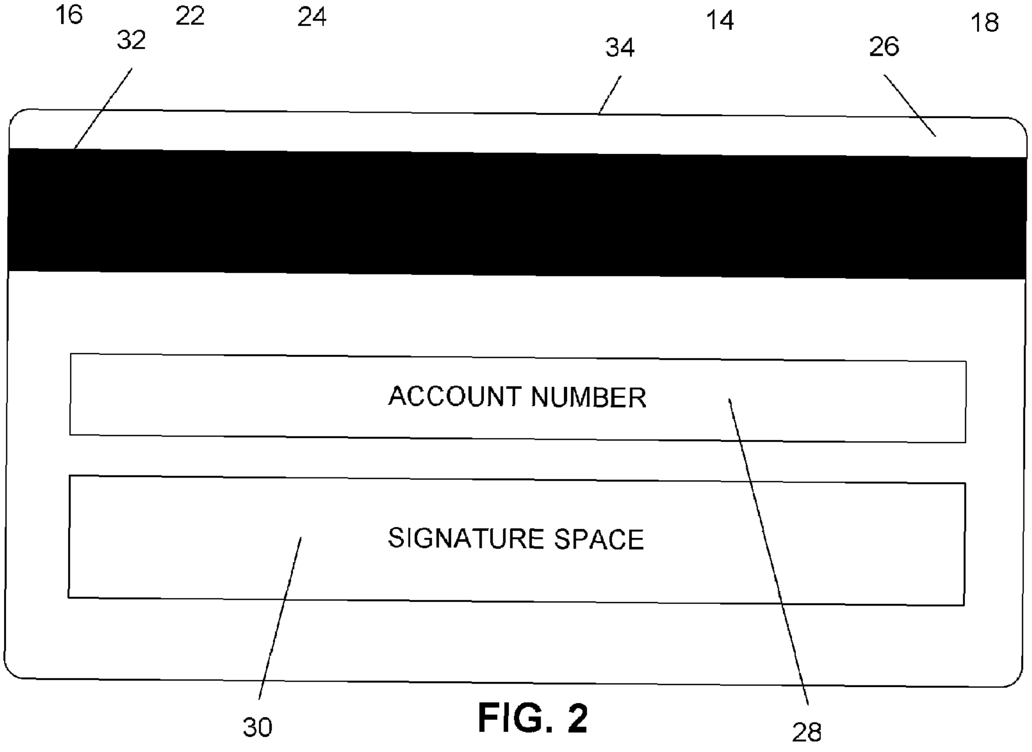
FIG. 2

FIG. 3 (PRIOR ART)
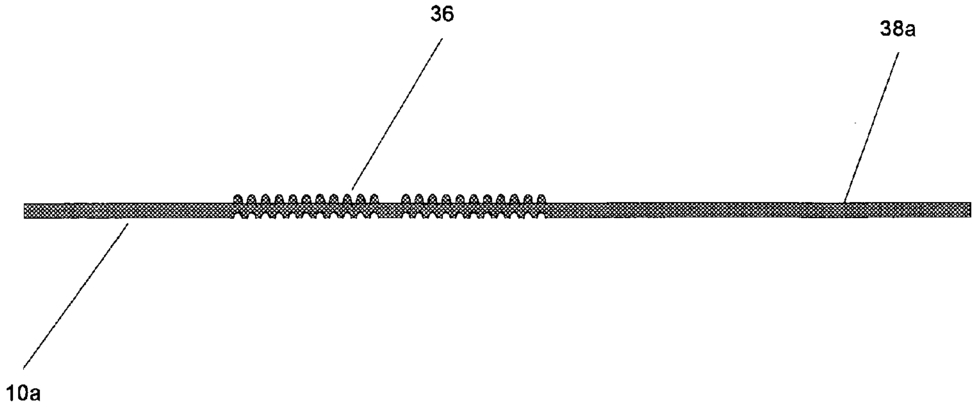
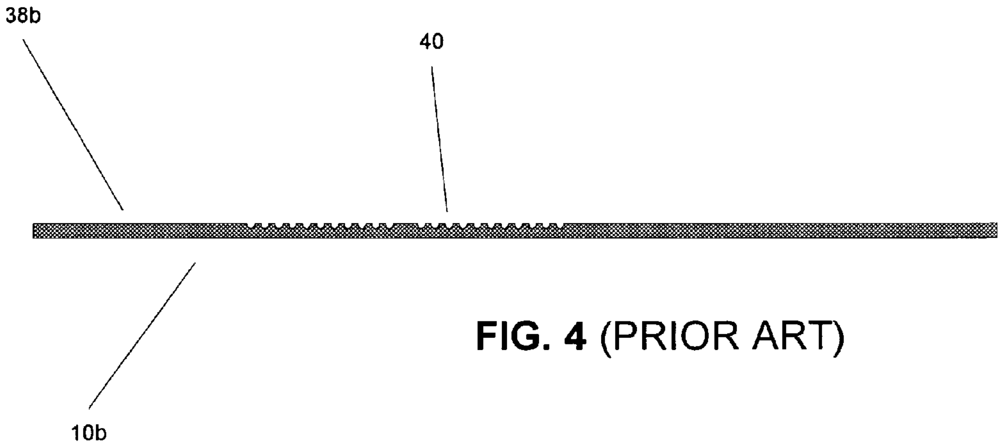
FIG. 4 (PRIOR ART)

FIG. 10
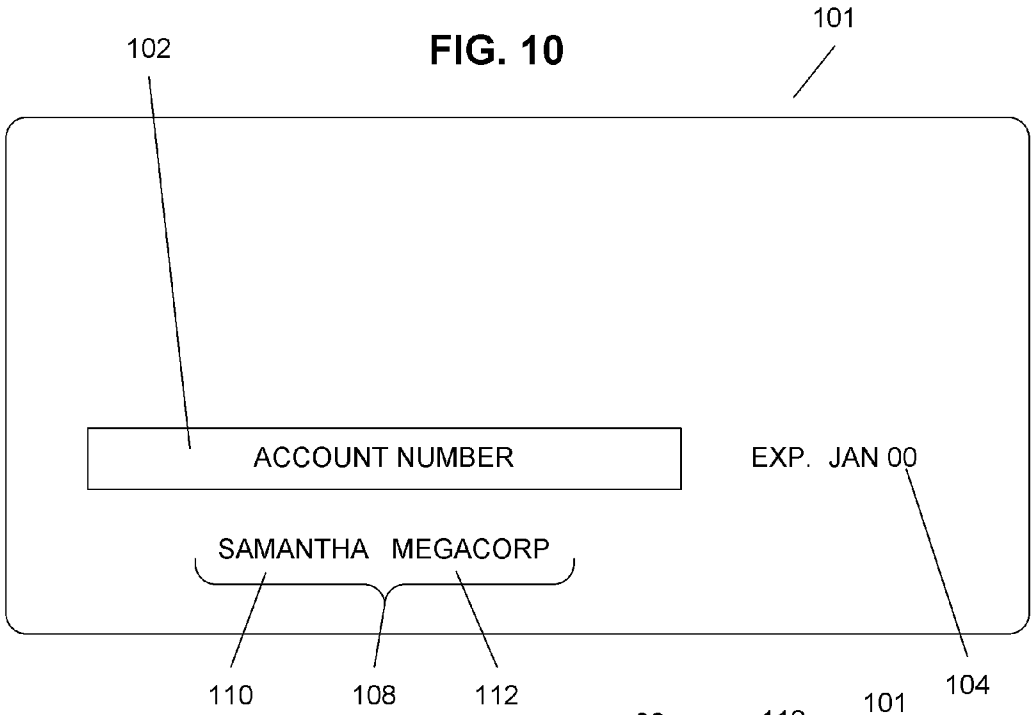
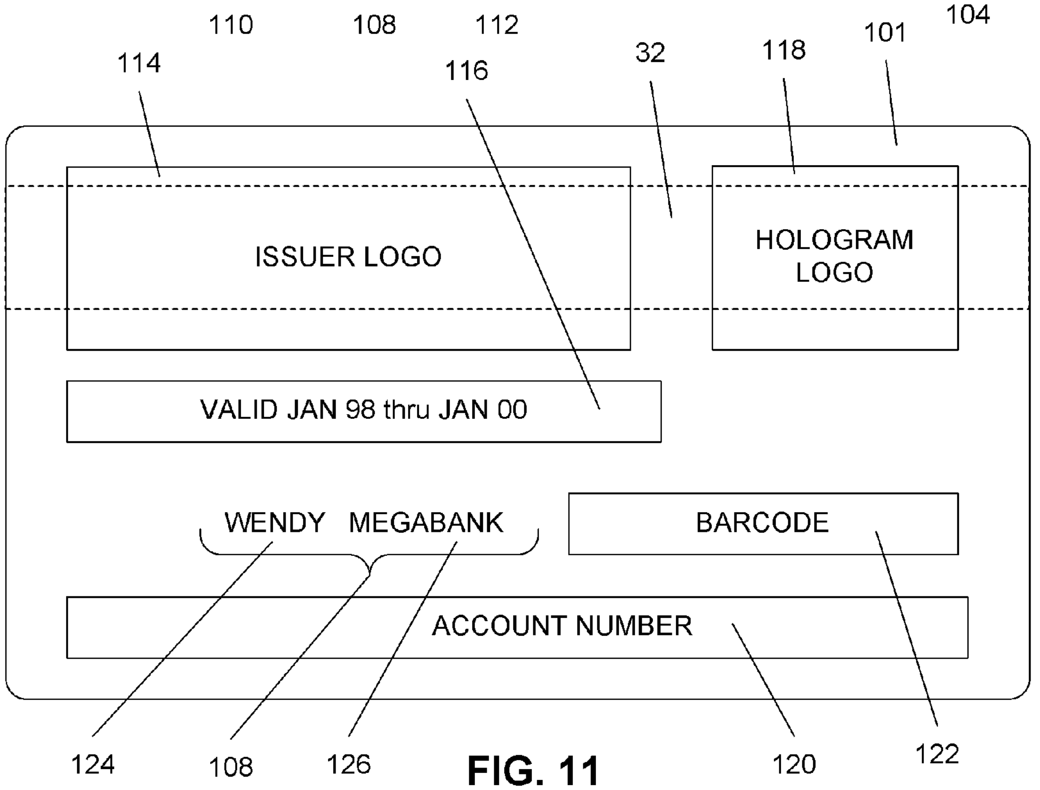
FIG. 11

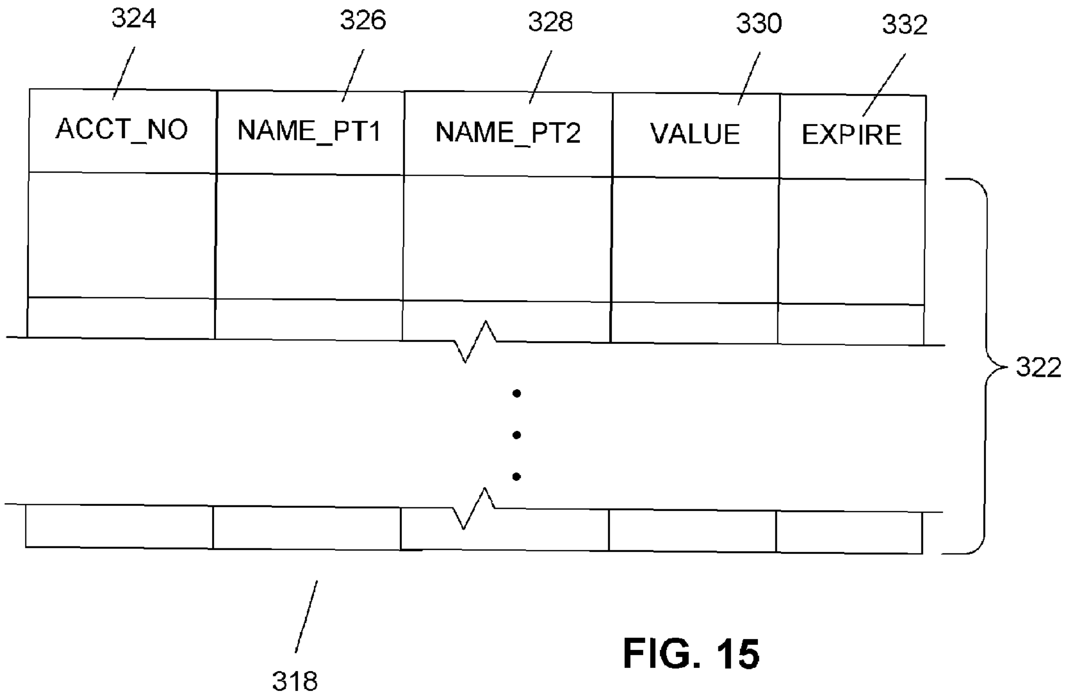
FIG. 15
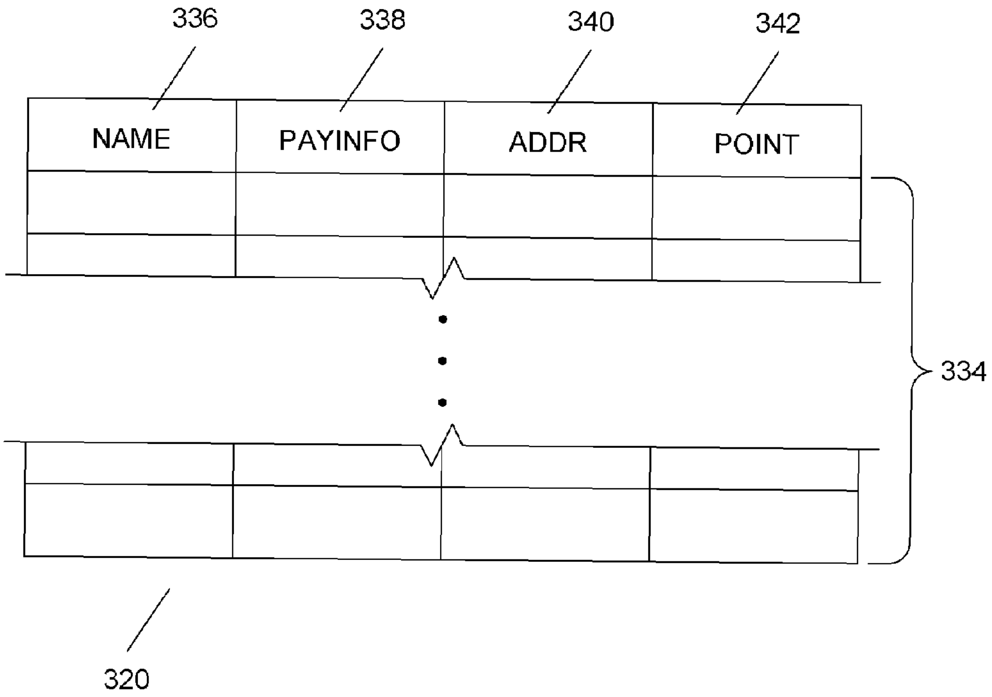

FINANCIAL SERVICES PAYMENT VEHICLE AND METHOD

CROSS REFERENCE TO RELATED APPLICATION(S)

This application is a continuation-in-part of a co-pending application entitled "Transfer Instrument", Ser. No. 09/188,810 filed Nov. 9, 1998.

FIELD OF THE INVENTION

The invention relates to anonymity in connection with payment vehicles. More particularly, the invention relates to anonymity for devices used as payment vehicles and their related accounts.

BACKGROUND OF THE INVENTION

Financial services cards in the form of credit, debit and charge cards have had great success in shifting the preferred method of payment in many segments of commerce, at the individual level, away from the use of cash and checks. They are also convenient, because a) they do not require a person to carry large sums of cash in order to make a high priced purchase, and b) they are, in many instances, readily acceptable forms of payment across national boundaries.

Obtaining a credit or charge card generally requires the person seeking the card to prove a level of credit worthiness, since payment for goods and/or services purchased today with the card will not be made until some time in the future. Debit cards may or may not require proof of creditworthiness, depending upon the particular account. People lacking sufficient creditworthiness, can often obtain a credit card if it is secured by a bank account and the usable credit line was linked to the amount of money in the account.

Debit cards appear similar to credit cards from the use standpoint, however, like secured credit cards, debit cards require sufficient money to be available in an account or a transaction involving the card will not be approved.

Charge cards are like regular credit cards in that they are unsecured, however they differ in the payment requirements.

Predecessors and variants of credit, debit and charge cards are store specific (for example, Sears or KMart) or chain specific (for example, Hertz) charge plates and travel and entertainment cards (for example, Diners Club, or AirTravel Card).

A common feature to all of those types of cards are that they are registered in the name of the cardholder, and the registration is evidenced by the cardholder name appearing in human readable form on the card, either through imprinting on a surface which may be further laminated over for durability, or using a method which causes the name to be elevated above the surface of the card or recessed into the surface of the card as if it was carved or engraved.

A further type of card which may be used as a form of payment are stored value cards and electronic modules, wallets and/or purses. While stored value cards represent physically producible tangible things, electronic modules are less so because, in some instances, they are part of a computer or terminal which is not readily carried from place to place. Electronic wallets or purses may be considered intangible to the extent they are not physically presentable, but may be considered as tangible to the extent that there may be a requirement for registration of the module, wallet or purse for traceability of transactions as well as the requirement for additional authenticity certification and/or cryptographic data which is necessary to ensure that the user is who they purport to be or the electronic "money" is valid.

The stored value cards fall into two classes: a) bearer, and b) registered. Bearer cards do not require any form of user identification or registration and contain no identification information, thus they may be used by anyone possessing the card. Example of bearer stored value cards are transit fare cards, photocopy cards. Registered cards require some form of user identification and/or registration to be used. An example being the trusted modules described in U.S. Pat. No. 5,557,518.

A disadvantage of all of the above cards is the lack of any degree of anonymity afforded to the user of the cards because, when the card, module, wallet or purse is issued and/or rendered usable, the cardholder's name and address are contained on the card in human readable or some form of coded or machine readable form.

Persons seeking a degree of anonymity associated with financial services card usage have been able to enlist the assistance of third parties who, for a substantial fee, will obtain a credit card for a person in a name selected by the person, typically through an offshore bank. In order to obtain the card however, the third party still requires proof of identity (an ID) but, if the person does not have an ID in the selected name, the third party can obtain that too. The person also needs a foreign mail drop in the selected name which will serve as the billing address for monthly statements and a security deposit equal to the maximum credit line.

Similarly, people in show business who use a "stage name" instead of their legal given name, may obtain a financial services card in the stage name. However, that practice affords those persons less anonymity than would likely result from their using their legal given name on the card.

SUMMARY OF THE INVENTION

In general, in a first aspect, the invention features an apparatus comprising a financial services card including an account identifier; and a name. The name has a first part and a second part, the first part being selected by a cardholder of the financial services card, the second part being selected by an issuer of the financial services card, the name representing a cardholder name in which a financial services card account identified by the account identifier is registered.

In general, in a second aspect, the invention features an apparatus comprising a financial services card account including an associated cardholder name, an account limit, a billing address and an expiration indicator. The expiration indicator represents a date on which a financial services account card for the financial services card account will not be usable. The billing address is associated with an issuer of the financial services card. The cardholder name having a first part representing a selection by a cardholder having an actual name and a second part representing a selection by an entity other than the cardholder having an association with the issuer of the financial services account. The second part is usable as a surrogate surname of the cardholder, so that when the cardholder makes a purchase and pays a merchant for the purchase via the financial services card account, the cardholder will use the cardholder name instead of the actual name and a payment for the purchase will be made without identifying the actual name of the cardholder.

In general, in a third aspect, the invention features an apparatus comprising a database stored on a computer readable media. The database includes records associated with a plurality of active financial services card accounts.

One of the financial services card account records has a name representing a cardholder for purposes of using the account. The name has a first part selected by the cardholder and a second part selected by a second party unrelated to the cardholder.

In general, in a fourth aspect, the invention features a method of administering financial services card accounts involving registering a financial services account in a cardholder name. The cardholder name having a first part, related to the cardholder, and a second part, identifying a party unrelated to the cardholder.

In general, in a fifth aspect, the invention features a transactional method involving accepting a payment via a financial services card account having an account number and a cardholder name. The cardholder name has a first part, selected by a user of the financial services card account, and a second part, selected by an entity unrelated to the user. The payment is accepted without requiring a presentation of a physical card for the financial services card account at about a time when the accepting occurs.

Preferred embodiments of the invention may also include one or more of the following features: The financial services card has a value; the value may be a credit limit; the value includes a monetary amount at least as great as a backing payment made by the cardholder; the financial account is maintained in a database which contains no record of an actual identity of the cardholder; the name appears in human readable and/or coded form; the first part includes alphabetical and numeric characters; or the second part is a proxy for a surname.

Particular embodiments of the invention may feature one or more of the following advantages: full or partial anonymity; the ability to match a value to an expected payment to prevent overcharging; the ability to match a value to an expected payment to prevent overcharging; the ability to create an affinity or correspondence to an e-mail address; status for the cardholder based upon the entity selecting or associated with the selector of the second part; greater acceptability by a merchant due to name recognition of the entity that selected the second part; and the usability as a corporate or entity supplied perk to enhance corporate or entity loyalty.

Preferred embodiments of the invention may also include one or more of the following features: the pointer identifies a settlement source, a settlement account, a DDA account, a billing address, or an issuing bank for a financial services card representing the financial services account; and/or limited or complete anonymity.

A further advantageous and desirable feature is that, if a physical card is issued for the account, since the issuer selects part of the name appearing on the card as the cardholder name, ID the name of the issuer can be used in place of the surname. This can afford a degree of prestige for the cardholder and/or render the card more acceptable to merchants since they may know that their payment will come from the issuer, thereby reducing the risk of default.

An additional and desirable feature of alternative embodiments is that the purchaser information is not associated with the financial services account and, once payment is authorized, no record is kept of the transaction of purchasing the card. Thus, any attempt to get behind the account would end up solely at the issuer.

The above advantages and features are of representative embodiments only, and are not exhaustive or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed above. However, no inference should be drawn regarding those discussed above relative to those not discussed above other than for purposes of space and reducing repetition. Thus, this summary of features and advantages should not be considered dispositive in determining equivalence. Additional features and advantages of the invention will become apparent in the following description, from the drawings, and from the claims. Finally, only those claim terms or elements specifically using the words "means" or "steps" are intended to be expressed in the manner allowed by Section 112, paragraph 6.

We have realized an invention which affords a high degree of anonymity, does not impose expensive set up fees, require falsified or pseudonymous identification to obtain or administrative arrangements such as offshore mail drops.

BRIEF DESCRIPTION OF THE DRAWINGS

The novel features believed characteristic of the invention are set forth in the appended claims. The invention itself, however, as well as the various enumerated and unenumerated features, aspects and advantages thereof, will be best understood by reference to the detailed description of specific embodiments which follows, when read in conjunction with the accompanying drawings, in which:

FIG. 1 shows one side of a financial services card;

FIG. 2 shows the reverse side of the card of FIG. 1;

FIG. 3 is a prior art cross section of a financial services card taken through the cardholder name area;

FIG. 4 is a prior art cross section of another financial services card taken through the cardholder name area;

FIG. 10 is an example financial services card according to the invention;

FIG. 11 is an example alternative embodiment of the card of FIG. 1 according to the invention;

FIG. 15 is an example simplified database for use with the invention;

DETAILED DESCRIPTION OF THE INVENTION

Figure 5:
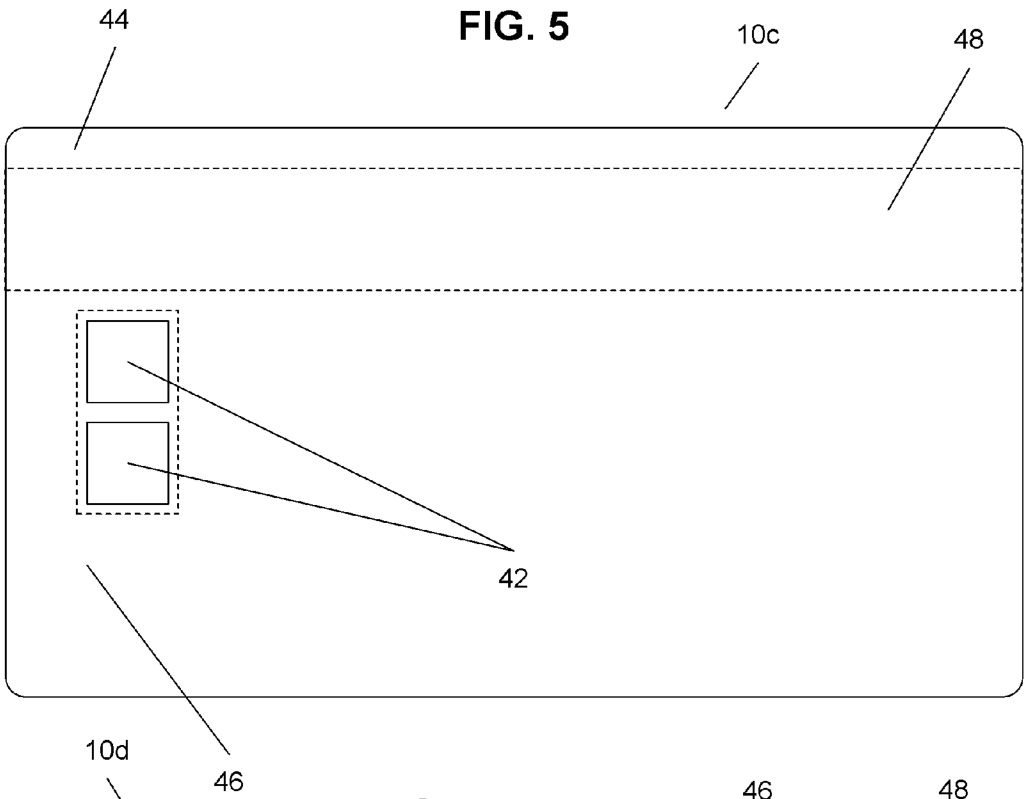
FIG. 5 is a contact smart card issued with the invention.

As used herein the term "related" as applied to persons is meant to be related by blood, birth, marriage or adoption. A person is not considered "related" to an entity that is created by operation of law such as a corporation, partnership, association, etc. unless the person and entity are wholly one and the same, even though the person may be associated with the entity through some form of employment, ownership, management, customer or contractual relationship, or related to a person acting on behalf of the entity.

A "banking institution" as used herein means a bank, a credit union, a savings and loan and/or an entity such as a stock, mutual fund, bond or other financial vehicle brokerage. "Physical card" and/or "physically producible card" as used herein means both a tangible card of the type issued, typically in a cardholder's name, and physically delivered to the cardholder in order to evidence the existence of a debit, credit or charge account and which is normally, although not necessarily, physically presented in connection with an economic transaction involving the account. Examples of such physical cards are debit cards, charge cards, credit cards or the like. The cards may be issued by banking institutions and related to national card accounts such as VISA, MasterCard, American Express, JCB, Eurocard, etc., store card accounts such as Sears and KMart, travel and entertainment card accounts such as Diners Club, Hertz or AirTravel Card.

Stored value type physical cards, or stored value "modules" or "purses" contained solely in software for purposes of holding digital money, are considered to be "physical cards" and physically producible herein if they are registered for authenticity purposes or require some form of credential of the issuer and/or user of the stored value. Stored value modules or purses are considered to be "physical" because during a transaction, they require providing some form of registration, transfer of some form of additional digital certification along with the digital money, or require forwarding of all or part of the data representing the electronic money provided by the purchaser to a third party for authentication at the time of the transaction. In connection with the invention all of these are akin to a physical presentation of a card.

The invention as described herein specifically pertains to those types of financial services cards which include a cardholder name or other alpha or numeric representation or identifier of the cardholder on the card in human readable or electronic form.

There are two main types of financial services cards available at present, magnetic stripe cards and Integrated Circuit or IC cards. IC cards have an embedded integrated circuit chip which can be configured to provide a variety of functions. IC cards are commonly referred to as smart cards.

Magnetic stripe cards incorporate a magnetic stripe which runs the length of the card adjacent one side. Data is stored in the magnetic stripe by causing variations in the magnetism of the material which forms the stripe. The magnetic stripe is read by moving it past a reading head which detects the magnetism of the stripe and converts the magnetic signal stored therein into an electric data signal. Financial services cards such as credit or debit cards use magnetic stripes or ICs to contain information on a user's bank or credit union accounts so that transactions can be attributed to those accounts merely by reading the card. By their nature, magnetic stripe cards are of more limited use than IC cards because only a small amount of data can be stored on them. For example, a bank customer's name, account details and some additional information, such as an encrypted PIN number, can be stored on a magnetic stripe card. If additional information is required to be stored, then a smart card with an embedded microprocessor would be required.

Smart cards can store considerably more data than a magnetic stripe card, and can be adapted to provide a number of functions in addition to merely storing data.

Smart cards are sub-divided into two groups: a) contact smart cards which are read by physical engagement with a reader; and 2) contactless smart cards which are read by capacitive or inductive terminals.

There are a variety of different magnetic stripe, contact smart card and contactless smart card formats. The majority of smart cards used for financial services cards use ISO standard formats: ISO 7810-13 for magnetic stripe cards, ISO 7816 for contact smart cards, and ISO 10536 for contactless smart cards. These standards determine the locations of magnetic stripes and terminals on the cards and the communication protocols utilized by each type of card.

FIG. 1 depicts one side 11 of a financial services card 10 of a debit, charge or credit card type embodying the invention. The card 10 contains a field which indicates the dates between which the card is valid 12, or alternatively an expiration date. Another section of the card bears an account number 14 which identifies the financial services account which the card represents and a cardholder name 16.

To discourage or prevent forgery, many financial services cards also include a hologram 18 which may contain the logo of the issuing card association or some difficult to duplicate symbol or characters. In most instances, the card 10 also contains a graphic 20 which may be a logo of the issuing bank or organization. More recently, sports organizations, companies and other types of organizations have also entered into arrangements with card issuing entities to have their logo placed on the face of financial services cards obtained by their employees, members, alumni and/or fans. These types of cards are often called co-branded cards. For purposes of understanding the invention, entities other than the issuing bank that enter into similar types of arrangements with issuing banks are intended to be included in references to issuing banks or are considered related to the issuer.

Additionally, the cardholder name 16 typically appears on the card 10 in human readable form. Typically, the cardholder name 16 is made up of a first name and a surname (or last name). In prior art cards, depending upon the cardholder, the cardholder name 16 may also include a title such as Dr., Mr., Mrs. or Ms. and may also include one or more "middle" names or initials, and/or an additional designation after the surname to indicate a familial relation (e.g. Jr. for "junior", II for "the second", III for "the third", etc.).

As will become apparent from the description herein, the card associated with the invention does not use a "cardholder name" in which the first name and surname are the cardholder's legal, or recognized name. Instead, the first name 22 is a name, word, or collection of characters selected by the cardholder and the surname 24 is a name, word, or collection of characters selected by a third party entity.

Of course it will be recognized that the card 10 may also contain additional information, a photograph or graphics and/or the items discussed may be located differently than shown. Similarly, any of the above may also or alternatively be located on the reverse side of the card 10.

FIG. 2 depicts the opposite or reverse side 26 of the card 10 in FIG. 1. This side 26 of the card 10 includes a copy of the account number 28 and an area 30 where the cardholder can sign their name, so that when the card is used, a visual comparison of the signature on the card and on a charge slip may be made when the card is presented as a verification that the cardholder is who they purport to be. As will be discussed below, the account 28 and/or signature 30 areas may or may not be found on any given financial services card. The card of FIG. 2 also depicts a type of financial services card called a magnetic stripe card because it has a magnetic stripe 32 running the length of the card adjacent a reference edge 34, in accordance with ISO 7810-13.

As in the prior art, the account number 14 appears on the card using known methods. It may be imprinted in ink in human readable form and it may, in some instances, be raised 36 relative to a surface 38*a* of the card 10*a* (as shown in FIG. 3, which is a cross section of a typical card taken through the area having the cardholder name 16). Alternatively, it may be embedded below a surface of the card under a laminate, or as another alternative, rendered into surface 38*b* of the card 10*b* (as shown in the cross section of another card 10*b* in FIG. 4), for example, by compression or engraving 40, or using some other alternative forms which may, or may not, be readable with the unaided human eye, for example by coding onto a magnetic strip, embedded chip or imprinted barcode. It will be understood that these and other known ways of adding the account number and/or name to cards using the invention may also be used.

As will be discussed below, the cardholder name 16 may also be applied using known prior art methods in a similar form to that used for the account number or alternatively and/or additionally be stored on the card electronically or in non-human readable form. Furthermore, as with the prior art, the same form need not necessarily be used for both the account number and cardholder name.

FIG. 5 depicts a contact smart card 10*c* used with the invention. The card 10*c* has two contact terminals 42 positioned on one side 44 of the card, in accordance with ISO 7816. The smart card also includes electronic circuits, in particular a microprocessor chip 46 embedded in the card 10*c* beneath the two terminals 42, and a magnetic stripe 48 positioned as in the magnetic stripe card of FIG. 2. The microprocessor chip 46 includes some storage capacity in the form of random access memory (RAM). The magnetic stripe 48 is positioned on the opposite side of the card from the smart card terminals 42 in accordance with ISO standards. The magnetic stripe and/or the RAM in the microprocessor chip 46 may be used to hold the cardholder name in accordance with the invention. The card may also optionally include one or more of a logo, hologram, validity indication, human readable account number and/or human readable cardholder name on the front or reverse side of the card.

Figure 6:
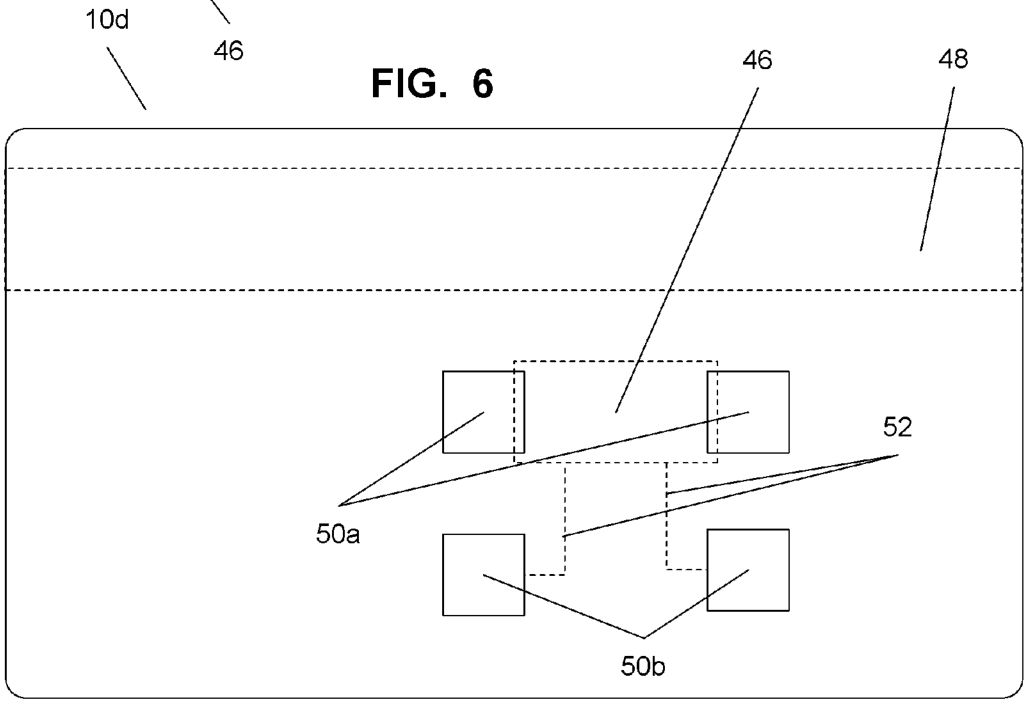
FIG. 6 is a contactless inductive smart card used with the invention.

FIG. 6 depicts a contactless inductive smart card 10*d* used with the invention. The card 10*d* has two pairs of contactless inductive terminals 50*a*, 50*b* positioned in accordance with ISO 10536 and an embedded microprocessor chip 46 beneath one of the pairs of terminals 50*a*. The terminals 50*a*, 50*b* are each connected to the microprocessor chip 46 by leads 52, the two connecting the terminals 50*a* to the microprocessor chip 46 not being shown. The contactless inductive smart card also includes a magnetic stripe 48 positioned as in the magnetic stripe card of FIG. 5.

Figure 7:
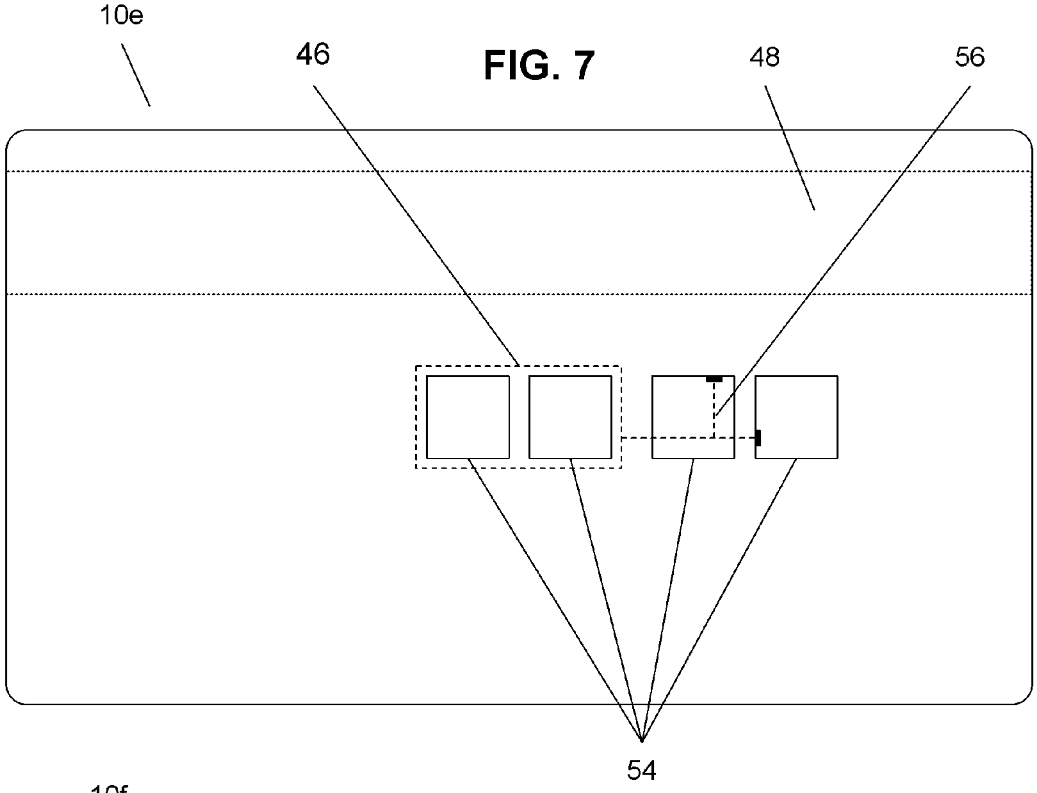
FIG. 7 is a contactless capacitive smart card used with the invention.

FIG. 7 depicts a contactless capacitive smart card 10*e* used with the invention. The card 10*e* has four contactless capacitive terminals 54 positioned in accordance with ISO 10536 and an embedded microprocessor chip 46 beneath one pair of terminals 54. The terminals 54 are each connected to the chip 46 by a lead 56 only two of which are shown. The contactless capacitive card 10*e* also includes a magnetic stripe 48 positioned as in the magnetic stripe card of FIG. 5.

Figure 8:
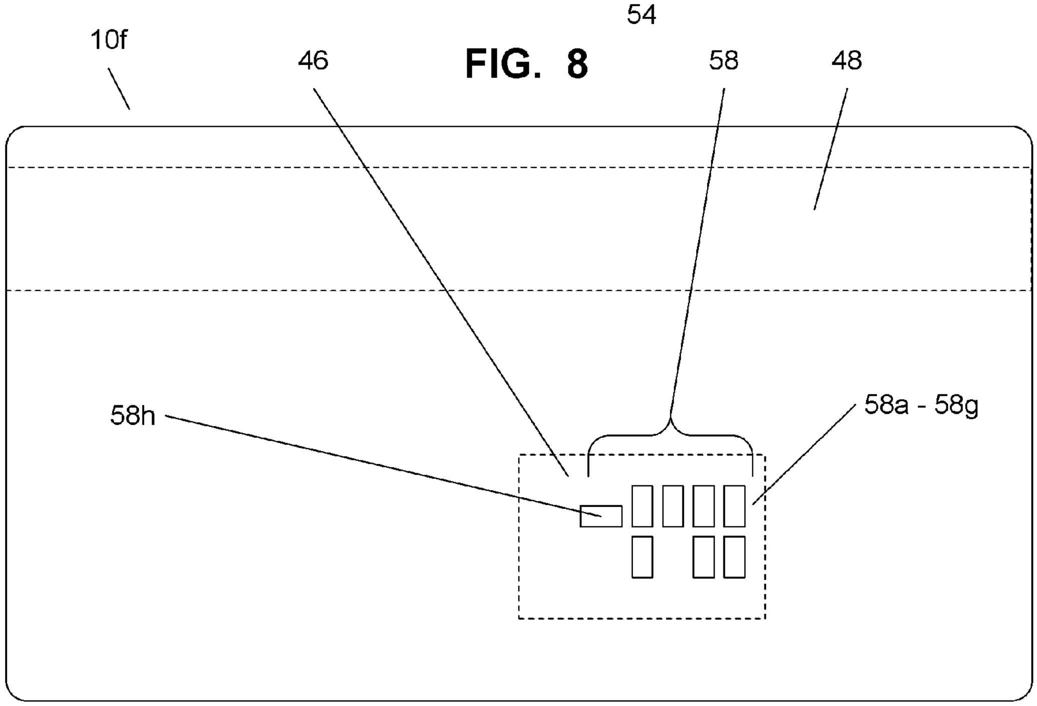
FIG. 8 is a non-ISO standard compliant contact smart card.

FIG. 8 depicts a non-ISO standard compliant contact smart card 10*f* used with the invention. The card 10*f* has eight contact terminals 58 positioned on one side of the card in a proprietary configuration and an embedded microprocessor chip 46 beneath the terminals 58. Seven of the contact terminals 58*a*-58*g* are aligned with each other with each placed vertically. The eighth terminal 58*h* is situated horizontally on the card 10*f*. The contact card 10*f* also includes a magnetic stripe 48 positioned as in the magnetic stripe card of FIG. 5.

The magnetic stripe 48 in each of the smart cards of FIGS. 5 through 8 need not contain any data, but may merely be used as a reference device to ensure proper placement or alignment of the contacts or terminals 42, 50*a*, 50*b*, 54, 58 for reading. For ease of understanding, the cards are specifically described as having a magnetic stripe 48 and/or a microprocessor chip 46 which may contain the cardholder name in accordance with the invention in non-human readable form, it will be recognized that similar information can be stored in machine readable form using other non-magnetic form of coding, for example, barcodes (one and two-dimensional) or electronically through the use of battery powered volatile storage, such as separate DRAM, hard wired circuitry, or inductive, capacitive and/or resistive elements. In those instances, the magnetic stripe 48 or the microprocessor chip 46 on or in the card may be dispensed with, without departing from the invention so long as when a card is used the card contains the cardholder name of the invention in some form.

Figure 9:
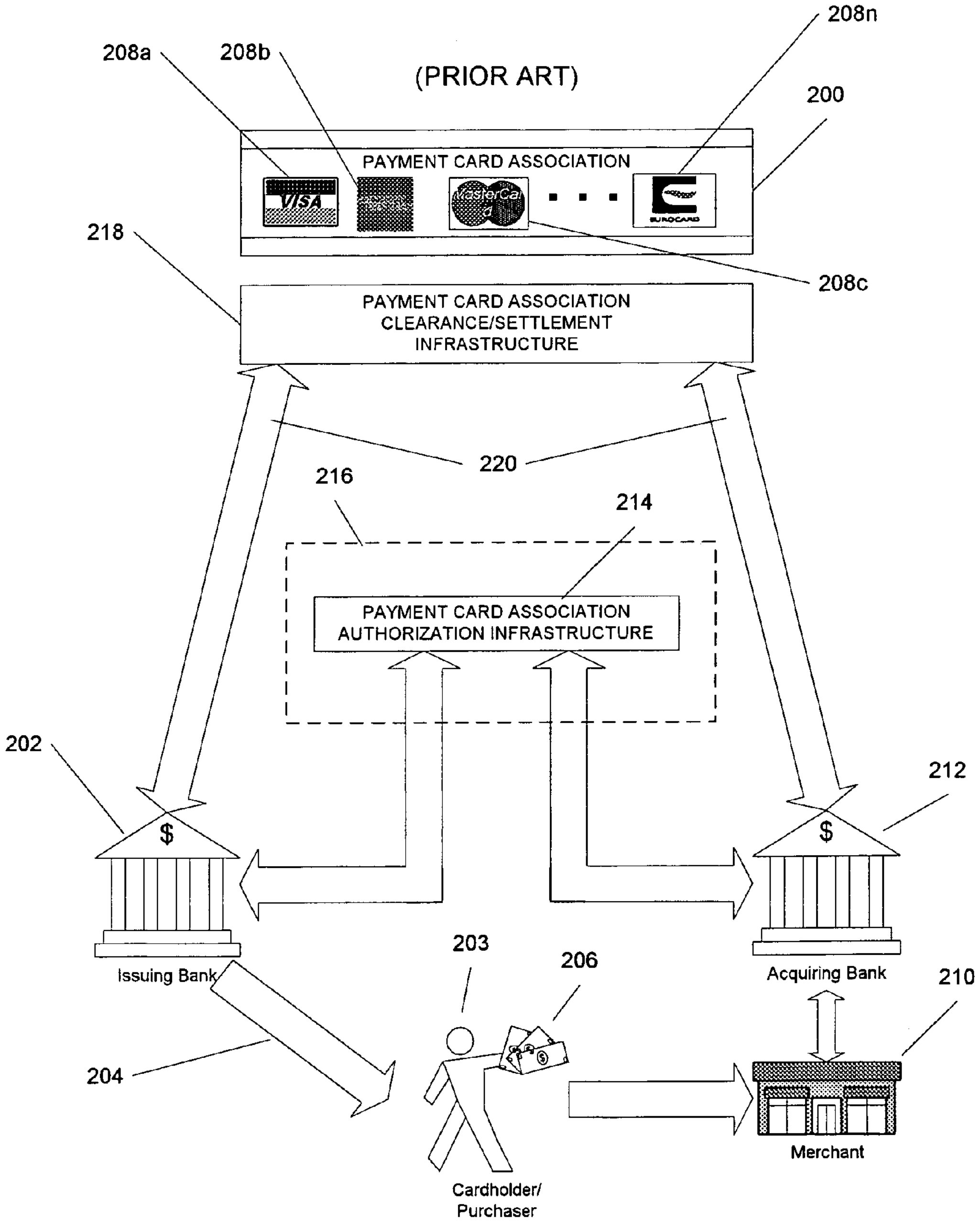
FIG. 9 is an overview of the prior art parties typically involved in the issuance and use of financial services cards.

Referring now to FIG. 9, financial services cards are most widely used in the retail situation for the purchase of goods or services. With most financial services cards the card companies 200 themselves do not generally directly deal with the cardholders 203 or merchants 210 but rather licensed member organizations, usually banks, to do this for them. A bank that issues cards is called a card issuing bank 202. Typically they register the cardholder 203 by registering and operating an account in the name of the cardholder to which payments may be charged, and providing 204 a physical card 206 incorporating the card association's logo 208*a* through 208*n* to the cardholder 203. Alternatively, they may have any of the above steps done on their behalf.

On the merchant's side of retail transactions, merchants 210 who wish to accept payments using the cards 206 register with a bank 212 affiliated with the card association 200. Banks which register merchants are often referred to as acquiring banks 212 or acquirers. Of course, in many instances, the same bank may be both an issuing bank 202 and an acquiring bank 212. Notable exceptions to the foregoing are American Express and Discover which each operate in the roles of both the issuing and acquiring banks.

When a purchase transaction is made by the cardholder 203 typically the merchant 210 seeks authorization using a infrastructure 214 set up by the card association 200, or in the case of an arrangement like American Express or Discover, one set up by the entity itself. It should be understood that, for clarity of description, the invention is described using the terms issuer, issuing bank, acquirer, acquiring bank, card association and authorization infrastructure, but they are also meant to refer to an entity where all those aspects are performed or provided by a single entity, like American Express or Discover, or where some other combination or division of those roles exists.

Authorization typically involves an authorization center 216 which is operated either by or on behalf of the acquiring bank 212. In general the merchant 210 contacts the authorization center 216 which may in some instances contact the card issuing bank 202 to verify availability of funds or, if the transaction amount is small enough, merely verify that the card has not been blacklisted. Alternatively, the authorization center 216 may stand in for the issuing bank 202 and approve transactions without contacting the issuing bank 202. This is typically done for small transactions only. Clearing or settlement of the transaction occurs in a similar fashion. The acquiring bank 212 contacts a clearing or settlement system 218 also operated by, or on behalf of, the card association 200 which then contacts the card issuing bank 202. A funds transfer 220 is initiated from the card issuing bank 202 to the acquiring bank 212, at some point at or after the transaction occurs, and results in a debit to the cardholders account and a credit to the merchant's account.

Financial services cards are typically classified into three types, on the basis of the time funds are due relative to the time of a transaction involving the card: i) pay before, ii). pay now, iii) pay later. The pay before cards are typically a form of stored value card which may either be specialized such as in the case of telephone or transit cards, or more generic cards typically known as "smart cards". Similarly, stored value modules or electronic "wallets" or "purses" can be considered pay before cards. Examples of such modules, wallets or purses are shown and described in U.S. Pat. Nos. 5,815,657, 5,642,419, 5,768,385, 5,373,558, 5,796,841, 5,815,577, 4,305,059.

With pay before cards, value must be transferred to the card, module, wallet or purse, before the card is used for a cardholder transaction and no separate "account" which will be accessed in connection with the transaction is maintained or associated with the card which contains the value transferred, other than that physically "holding" the value on the card or in the module, wallet or purse. In other words, if the card is lost, or the module damaged, the value is lost to the cardholder unless the card is recovered unused or the data in the module can be meaningfully recovered. Similarly, if the software implementing the wallet or purse is erased, damaged or corrupted the value will be lost unless the data can be meaningfully recovered.

With pay now cards, otherwise known as debit cards, the card is linked to a bank or other funded account so that at or about the time the transaction takes places the amount is automatically transferred from the customer account to the merchant's bank account in a debit transaction.

Pay later type cards refer to credit cards or charge cards. The difference between a credit card and a charge card is that with a credit card the outstanding balance need not be paid in full at the end of the billing cycle, whereas with a charge card an outstanding balance must be paid in full at the end of the cycle or else usage of the card is suspended until the balance is paid in full.

The invention described herein pertains to any of the above types of cards which share the common characteristic of having a cardholder name, which corresponds to an account registration name, on or in the card.

In accordance with the invention, the financial services card account is registered in a cardholder name whereby one part of the cardholder name on or in the card, preferably the part which corresponds with the first name with prior art financial services cards, is selected by the cardholder and another part of the cardholder name, preferably the part which corresponds with the surname with prior art financial services cards. The first and second parts of the cardholder name may each independently consist of purely alphabetic characters, numeric characters or some combination thereof. Preferably, the first part of the cardholder name bears some relation to the actual name of the cardholder, although the actual name may not be discernable from it. Examples of preferable first parts are: actual first names (e.g. Richard, Wendy, Ian, Samantha), nicknames (e.g. Buddy, Mac, Buzz, Hank), e-mail names (e.g. johnd, blu911, 2kut4u) or some combination of first and surnames (e.g. alham for Alexander Hamilton).

FIG. 10 depicts an example financial services card 101 in accordance with the invention. The card includes an account number 102 which may be present on the card in human readable form and/or in machine readable form. The card also includes a validity indication 104 which identifies when the card is no longer valid. With the card of FIG. 10, this information appears in the form of an expiration date of "JAN 00". Again, the validity indication 106 may appear in human readable form and/or machine readable form.

The card also includes a cardholder name 108. In accordance with then invention, the first part 110 of the name 108 "SAMANTHA" was selected by, and corresponds to, the individual who is the cardholder. The second part 112 of the name 108 "MEGACORP" was not selected by the cardholder but instead, was selected by a different entity. In this case, the entity that selected the second part 112 of the name 108 was an agent or representative of the issuer, as a result of some arrangement between the issuer and Mega Corp. or by an agent or representative of Mega Corp. itself.

FIG. 11 depicts an example alternative embodiment of a financial services card 101 in accordance with the invention. The card 101 is similar to the card of FIG. 1 in that it includes a magnetic strip 32, an issuer logo 114, a validity indication 116 and a hologram 118 of the card issuer's logo 114. In this embodiment, a human readable account number 120 appears on the card in an area near the bottom of the card, and also is represented in machine readable form for example, electronically on the magnetic strip 32 on the opposite side of the card and/or in a barcode 122 on the face of the card. The As with the card of FIG. 1, the cardholder name 108 is also represented on the card 101. One part 124 of the cardholder name 108, "WENDY" was selected by the cardholder to appear on the card 101 as the cardholder's first name. Another part 126 of the cardholder name 108, "MEGABANK" was selected by the card issuing bank, Mega Bank, Inc.

Figure 12:
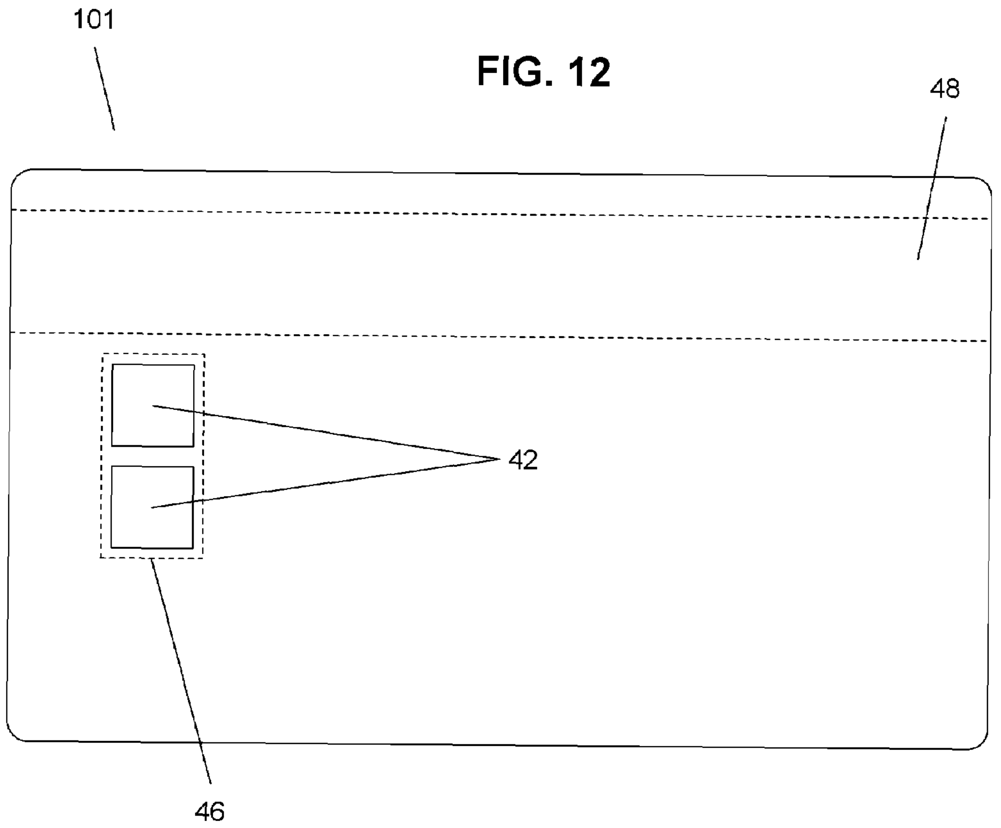
FIG. 12 is a further alternative embodiment according to the invention.
Figure 13:
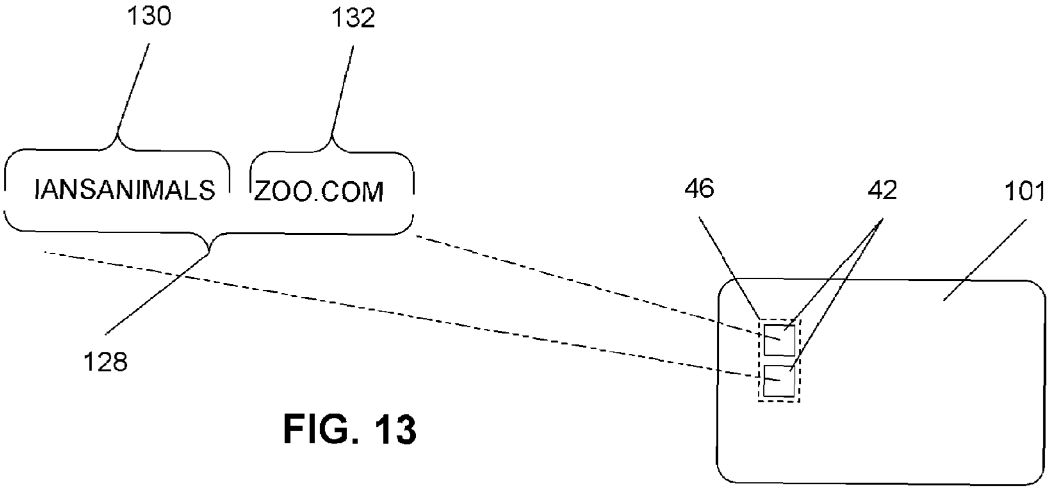
FIG. 13 is an illustration of a cardholder name as read from the embodiment of FIG. 12.

FIG. 12 depicts a further alternative example embodiment of a financial services card 101 in accordance with the invention. In this embodiment, the physical card is a stored value card of the type described in FIG. 5 in which the cardholder name is stored as digital information in the microprocessor chip 46 and can only be read electrically using the terminals 42. In this case, the card is issued through a promotional arrangement with the cardholder's e-mail provider, Zoo Mail Co. The cardholder has an e-mail address of "iansanimals@zoo.com". In this embodiment, the electronically stored cardholder name 128, when read from the RAM in the microprocessor 46 via the terminals 42 and translated from its stored form to human readable form appears as depicted in FIG. 13. One part 130 of the cardholder name 128 is "IANSANIMALS" which represents the cardholder's e-mail user name. The other part 132 of the cardholder name 128 is "ZOO.COM" which was not selected by the cardholder represents the e-mail provider Zoo Mail Co. Notably, with this embodiment, either part 130, 132 of the cardholder name could specifically be considered the "first name" or "surname". Thus, in this embodiment, the cardholder name would be proper if it was read as IANSANIMALS_ZOO.com or ZOO.COM_IANS-ANIMALS, so long as it was done consistently according to card reader and usability requirements.

At this point it is worthwhile to note what is meant herein by name "selection". although the cardholder may have selected the e-mail provider, that selection is not considered to be a cardholder selection for purposes of the invention, since the cardholder presumably did not select the Zoo Mail company name or the ZOO.COM domain name. In other words, although the cardholder may choose between a co-branded card for one sports team over another or, for example, issuing bank "First Multinational Bankcorp." over "International Trust, Inc.", the selection of any those names was done by each of those entities at some point and not by the cardholder. Thus, they should be considered as "selected", for purposes of name selection as described herein, by the respective business entities. Furthermore, even if the cardholder is given a choice among, for example, multiple choices (e.g. ZOO.COM, Zoo Mail, ZOOMAIL, etc.) since the options are specified by Zoo Mail Co. (or the issuer on Zoo Mail's behalf), an election from among the offered options is not considered to be a "selection" as described herein.

In general, while the cardholder selects one part of what ultimately becomes the cardholder name, another part of the name is selected by an entity other than one having a familial relation with the cardholder, most typically the issuer or an entity related to or associated with the issuer through a commercial relationship, such as for co-branding purposes.

Having described a number of example desirable variations from among the myriad of possible physical cards which may be used in connection with the invention, the system configuration and processes of acquisition and registration of the accounts will now be discussed.

System Structure

Figure 14:
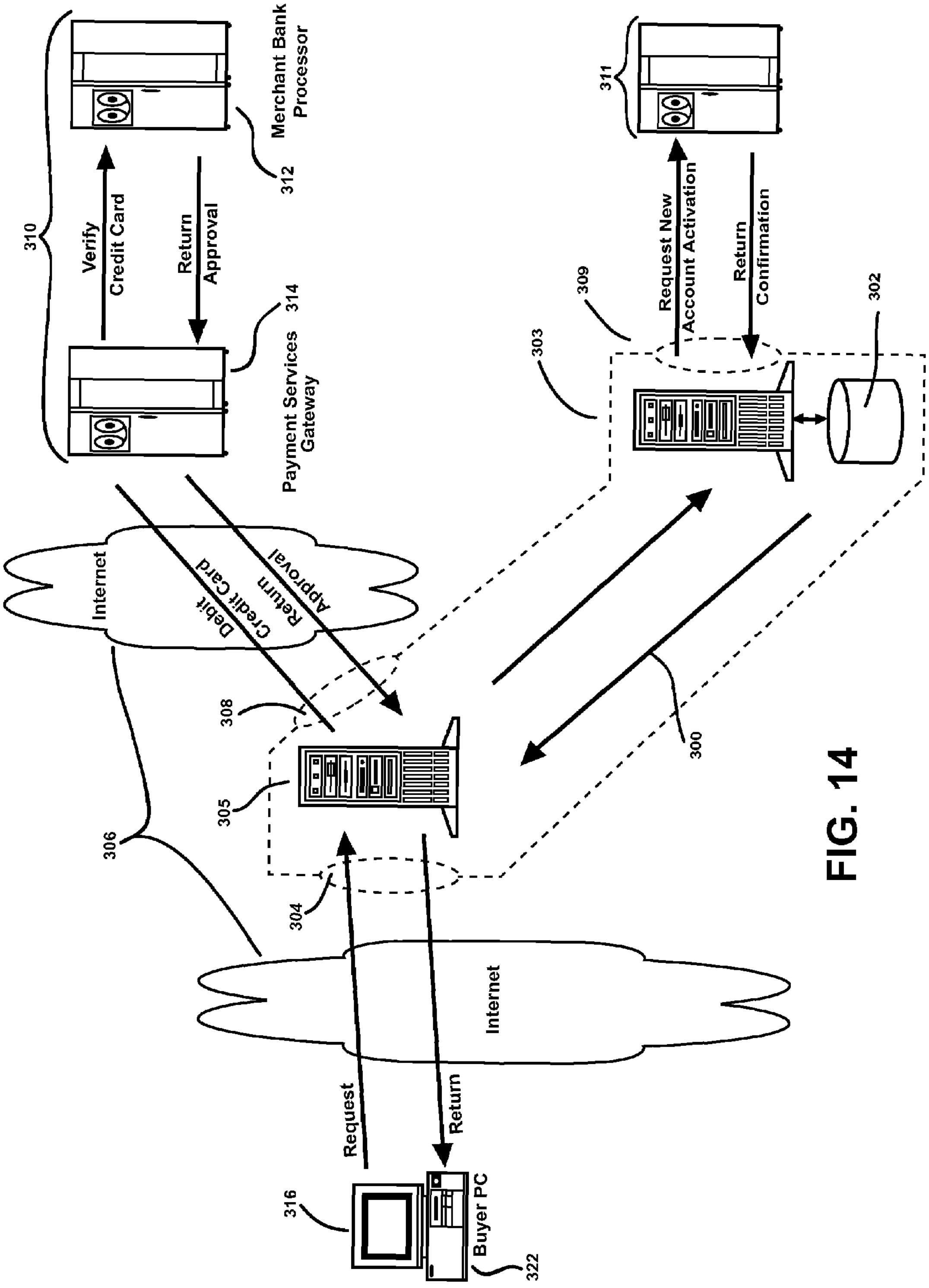
FIG. 14 is an example arrangement for a system used in ordering and registering a financial services card according to the invention.

FIG. 14, shows an example arrangement for a system 300 used in ordering and registering a financial services card in accordance with the invention. The system consists of a database 302 connected to a server 303, and another server 305 with an interface 304 to the internet or World Wide Web (interchangeable referred to herein as "the Web") 306 and an interface 308 to a banking system 310 which acts as the merchant bank. Notably, the interface 304 to the Web may either be provided directly or through an entity which serves as a gateway to the internet and/or hosts web pages (commonly referred to as an internet service provider or ISP).

As shown in FIG. 14, interfaces 304 and 308 are resident on the same server 305 although it is not necessary. In many cases it is desirable and advantageous to have the web interface 304 resident on one server 305 and the interface 308 the merchant bank resident on a different server (not shown), mostly for security and performance reasons not pertinent to the invention. The database server 302 also includes an interface 309 to the issuing bank 311.

Servers capable of being the interface server 305 and/or the database server 303 are well known and both the hardware and associated software are constantly being changed improved, reduced in cost and/or complexity. Thus, given the rapid pace by which those changes and improvements occur, the specifically elaborated hardware and software will likely be obsolete in the near future. Furthermore, the specific hardware used as the servers 303, 305 and the associated software is not critical to understanding the invention. However, by way of example, one suitable interface server 305 is a server having an Intel 333 MHz Pentium II processor with 512K cache, 128 MB of RAM, a 9.1 GB Ultra-2/LVD SCSI7 hard drive, an Intel EtherExpress PRO 100/B PCI Ethernet adapter, and a 12/24 GB DAT tape backup unit. Additionally, example software which may be used in practicing the invention includes Windows NT Server 4.0 SP3 with NFTS, an option pack including IIS 4.0, SMTP Server, Index Server, NNTP Server and MTS, Site Server 3.0 Commerce Edition SP 1.

The database server 303 is similarly constructed to have an Intel 333 MHz Pentium II processor with 512K cache, 256 MB of RAM, Dual Channel RAID with 16 MB cache. The server storage consists of three RAID-5 9.1 GB drives. Two mirrored 9.1 GB drives for the operating system and database log files and one online spare 9.1 GB drive. The server 303 also has an Intel EtherExpress PRO 100/B PCI Ethernet adapter, 12/24 GB DAT tape backup unit and a 32×SCSI CD-ROM. Example software which may be used in practicing the invention includes Windows NT Server 4.0 SP3with NFTS, an option pack including IIS 4.0, SMTP Server, Index Server, NNTP Server and MTS, and SQL Server 6.5 SP4 and updated Site Server 3.0 with Hotfixes.

As will become apparent, it may also be desirable to split up the work performed by the database server 303 into two physically distinct servers and/or to distribute the database 302 such that information usable to actually identify a cardholder is maintained separately, for example, on one server or in one part of the database and the information necessary for use by the cardholder is resident on the other server or in a physically segregated and secure separate part of the database. In this manner, an additional layer of security may be provided by severely limiting the persons and circumstances under which the identifying information may be accessed.

Additionally, in some embodiments, the system may include a separate or dedicated interface 309 to an issuing bank 311 from which accounts may be acquired so that communications and account acquisitions can occur securely, directly and in real time.

The database 302 is used to maintain a registry of the active financial services card accounts, which have been acquired from an issuing bank 311. Depending upon the embodiment, database record entries are created in the database 302 as part of the purchase process, as part of the optional activation process, or alternatively they may be created before either process occurs. The interface server 305 routinely communicates with the database server 303 as part of the account creation and management processes. The interface to the Web 304 typically consists of a URL or Web address for a home page to which a prospective purchaser 322 may connect. The interface 304 may alternatively, or further, consist of an e-mail address. Of course, in the simplest embodiments, the interface 304 may consist of a mail address or telephone number which may be called by a prospective purchaser.

The interface 308 to the banking system 310 is essentially a direct or indirect link from the "merchant"/offeror 300 of the financial services card to its acquiring bank 312. Numerous types of interfaces between merchants and banks for clearance and settlement of transactions are known to those in the art. Advantageously, the particular interface employed in any specific embodiment is a matter of choice, the specific selection being driven by factors not critical to understanding the invention, such as: the type(s) of payment which will be accepted, such as debit/charge or credit cards, electronic money, precious metals, for example, using e-Gold, or electronic surrogates for money, checks or other types of negotiable instruments or their electronic analogs; who the offeror of the transfer instrument uses as its acquiring bank; and/or whether authorization and/or clearance fees are charged. By way of example for one embodiment, the interface 308 of FIG. 14 is an indirect interface through the internet 306 to the acquiring bank 312 using, for example, the CyberCash system infrastructure as a payment services gateway 314. The interface 308 to the banking system 310 is used to authorize and clear payments made by a purchaser 316 of a financial services card.

The interface 309 is a direct interface to the issuer 311 of the accounts. As shown in FIG. 14, the acquiring bank 312 and the issuer 311 are different and unrelated entities, for example, the acquiring bank 312 may be a Savings & Loan Association and the issuer 311 may be a brokerage which offers credit and debit cards to their customers.

As will be apparent, in the arrangement of FIG. 14, the banks 311 and 312 could be replaced by a single entity acting as both an issuing bank and an acquiring bank for the offeror. Thus, the interfaces 308 and 309 to the entity might be combined into a single interface, or kept discrete.

The various processes associated with the creation, issuance and registration of financial services card in accordance with the invention will now be discussed. For clarity, the different processes are discussed somewhat sequentially although those of skill in the art will appreciate that, while certain steps must necessarily precede others, many of the steps can proceed in a different order or concurrently with other steps. Thus, unless a specific order is inherently necessarily required or is specifically referred to herein as necessary for operation of the invention, it will be recognized that no specific ordering is to be inferred from the description.

Additionally, and advantageously, due to the similarity of the system structures, a payment vehicle in accordance with the invention may be used to create an anonymous Transfer Instrument, in which no physical card is issued for the account and provided to the recipient at or before the time when it is used, as described in commonly assigned application entitled "Transfer Instrument", Ser. No. 09/188,810 filed Nov. 9, 1998, the entire disclosure of which is incorporated herein by reference.

Account Creation Process

With continuing reference to FIG. 14, by way of example, the offeror 300 obtains financial services card accounts from an issuing bank 311. The issuing bank 311 provides, for example, a series of account numbers corresponding to debit, credit and/or charge card accounts. The financial services card accounts are initially preferably issued in the name of the offeror 300 and preset, in the case of debit cards, to zero value, or, in the case of credit or charge cards, a zero balance and credit limit.

Those accounts, and their associated information, are recorded in the database 302 and will serve as the pool of accounts for which the financial services cards will issue.

As an alternative to multiple accounts being transferred to the offeror/issuer 300 in advance, accounts (and/or their account numbers) can be held by the bank 311 until a request is made for an account as part of the purchase process via the interface 309. At that time the offeror 300 will request that the issuing bank 311 provide an account number for the type of account needed. As will be recognized from the description below, depending upon the specific embodiment, the placement of an entry for the account in the database may itself indicate that the account is active. Otherwise, the account, although entered into the database 302, may have an associated "active" field which is marked inactive until other account activation parameters are satisfied. Advantageously, in this case there is no need to stockpile issued accounts.

In this embodiment, the database 302 is configured as a pair of tables 318, 320 as shown in FIG. 15. The database 302 correlates anonymous information for individual financial services cards with active individual accounts in one table 318. The second table 320 is used as a temporary holding place for information which would reveal the actual identify of the cardholder.

The first table 318 contains a set of records 322 for each account made up of fields such as: account number 324, cardholder name part 1 326, cardholder name part 2 328, the account balance, value or limit 330 and expiration date 332.

The second table 320 contains records 334 with fields correlating to identifying information for a given account, such as actual name, payment information 338 like credit card number and expiration date, address for card delivery 340 and a pointer 342 which correlates a particular entry in the two tables 318, 320. Example ways of correlating the two tables 318, 320 being duplication of the account number 324, a hash number, a record number, etc. . . .

When an account is activated, or upon shipment of a physical card, the contents of the second table 320 for that account is purged. There are a multitude of ways to construct a database meeting that criterion.

Depending upon the level of complexity desired or the desire to maintain or track information associated with a particular account or to allow for expansion of available offerings, the database 302 is preferably constructed from a number of tables which are interrelated with each other and which may contain additional fields reserved for future expansion or options.

In the simplest embodiment, the database 302 will have entries for each account which identify the user in an anonymous fashion, the account number, the issuer or other entity that supplies the second part of the customer name, and some indication of the account status such as if it is active and the available balance.

Additionally, for some period of time, the database information will be correlatable to information which would clearly identify the purchaser. As a general matter, this time period will be until the purchase transaction is complete. Of course it will be recognized that the information may be kept longer for example, for prevention of credit card fraud or to comply with legal requirements. In instances where the information may be kept beyond completion of the transaction it is important, but not critical, that the identifying information be made inaccessible through for example, strict security, encryption, offloading to another machine or site, escrow with a third party or other such procedures to preserve a anonymity from the offeror/issuer perspective.

Figure 16:
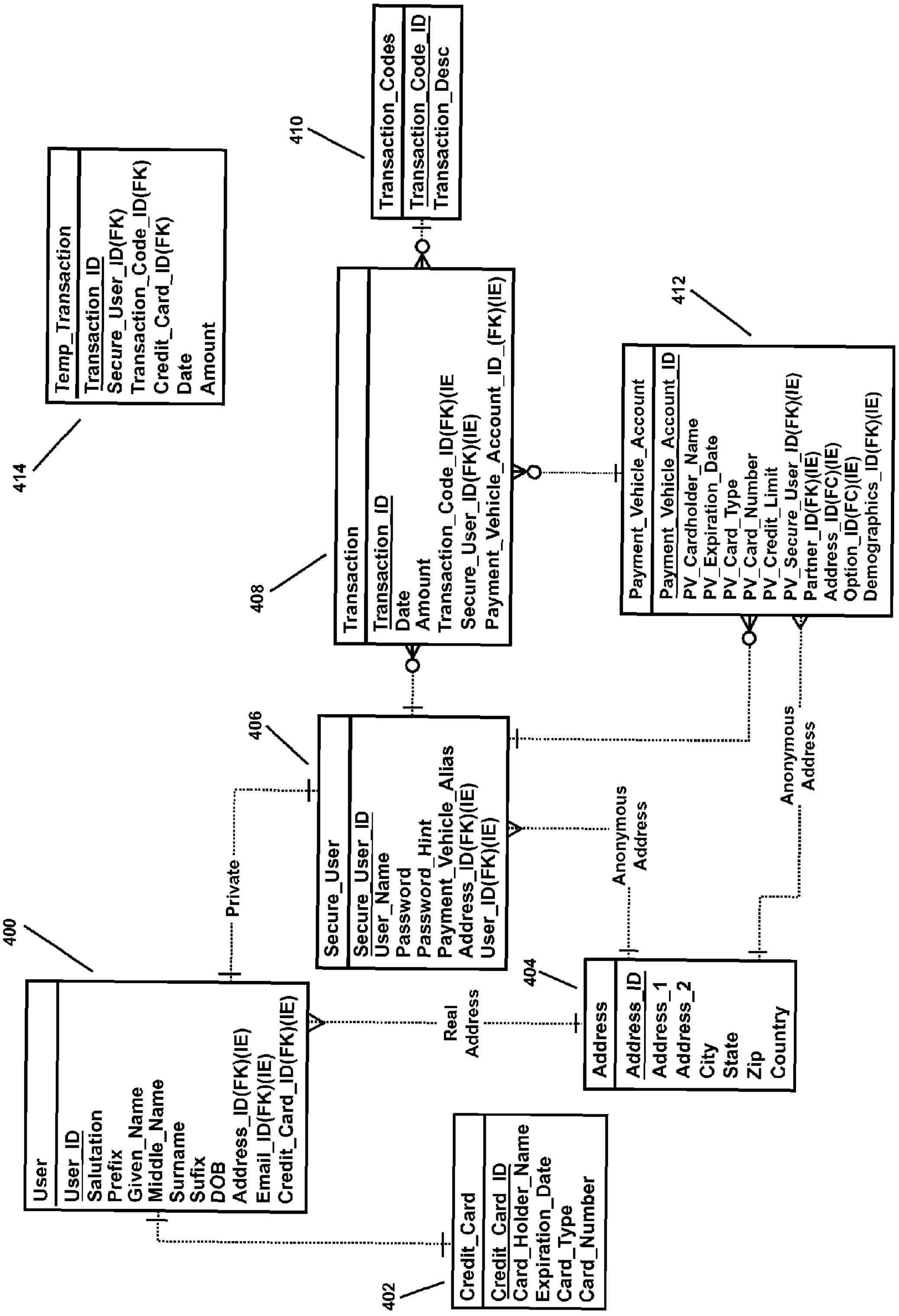
FIG. 16 is an ERD diagram for an example database for use with the invention.

A more commercially suitable example embodiment of the database 324 will be evident from reference to FIG. 16; FIG. 16 depicts an Entity Relationship Diagram (ERD) of a type used by those of skill in the art to assist in describing and constructing databases, in this case specifically to construct a database 302 in accordance with the invention. As shown, the database will be made up of a number of interrelated tables 400 through 414. At the top of each table is a name for each table and underneath the name is a list of the fields which define each record.

In this embodiment, the database 302 is distributed such that the user table 400, the Credit_Card table 402 and the Address table 404 all reside on one secure server and the Secure User table 406, Transaction table 408, Transaction_Codes table 410 and Payment_Vehicle_Account table 412 all reside on another server. For security reasons the secure server is geographically remote from the other server.

The tables 400, 402, 404 contain information which actually identify the name, address and, at the time payment is provided, credit card information. It is useful to note that in this embodiment only credit card payment for the Financial Services Vehicle is allowed. In other embodiments, purchase by check, wire transfer, electronic scrip or money or other schemes may also be allowed. In those instances, additional tables or modification of the Credit_Card table 402 would be required to allow for the use of those payment methods, the implementation of which being within the skill of those in the art in light of the disclosure herein.

The User table 400 represents the actual name and other identifying information for a purchaser of the inventive financial services vehicle.

The Credit_Card table 402 contains the credit card (or other payment form) information for individual purchasers listed in the User table 400.

The Address table 404 contains actual address information for individual purchasers listed in the User table 400.

Once a purchase transaction is complete, the contents of the tables 400, 402, 404 for the particular record account may be purged, thereby ensuring anonymity of the purchaser unless they reveal their identity through the portion of the cardholder name they selected or through their actions. In any event, the issuer will be unable to positively identify the actual identity of the cardholder and only inferentially for example, in a simple case using the password from the Secure User table 406 or through some other algorithmic correlation of available information in a more complex and secure case.

Of course it will be recognized that, if a physical card is to be delivered, the identifying information, or at least the address information in the Address table 404 may need to be retained until the card is created and sent, at which time it can be purged.

The Secure_User table 406 defines the anonymous or pseudonymous user identity. It also contains optional information which can allow a cardholder to see the account status in order to determine, for example, the remaining balance or the usage of the card. In this way, the cardholder can view the on-line equivalent of a credit card statement. It also contains a password which is the only way a cardholder can identify themselves for a particular account.

The Transaction table 408 is accessed when the inventive financial services card account is used to make a purchase, so that the purchase transaction can be settled. It works in conjunction with the Transaction_Codes table 410.

The Payment_Vehicle_Account table 412 contains the core information for the inventive financial services card account. It is this table which holds the cardholder name that has been constructed from the selections by the cardholder and another entity. The Temp_Transaction table 414 is a temporary table used during the purchase process to hold the cardholder's payment information until the payment is settled, at which time the record for the purchase transaction is purged, although some field information, such as TRANSACTION_CODE_ID, Date and Account may be retained, for example, for accounting purposes.

Figure 17:
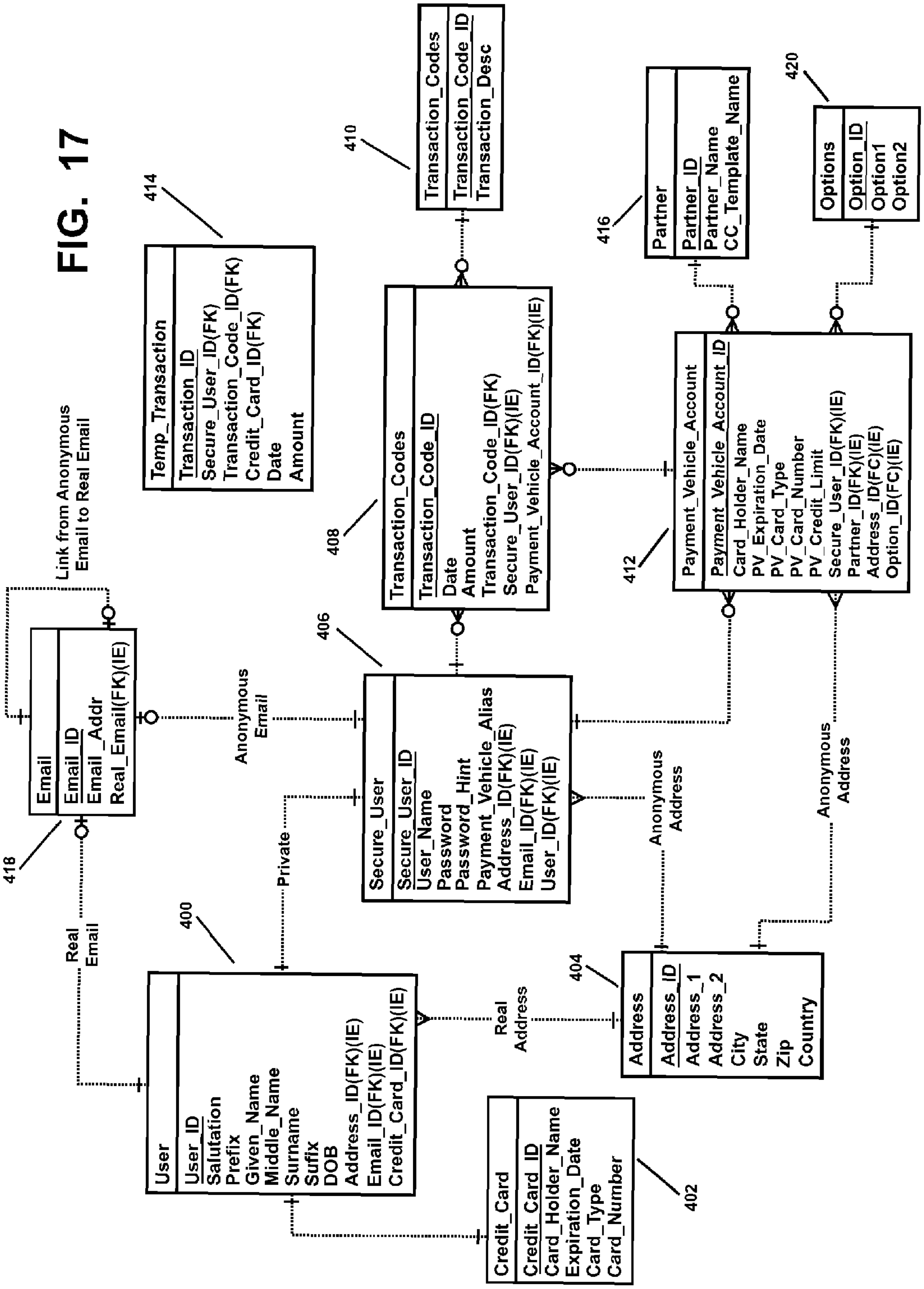
FIG. 17 is an ERD diagram for another example database for use with the invention.

FIG. 17 is a variant of the ERD diagram for the database of FIG. 16. In this database, there are three additional individually optional tables 416, 418, 420.

The Partner table 416 identifies the entity that selects the second part of a cardholder name and also holds the particular second part or surname selections in the CC_Template_Name field, for example, "MEGACORP", "MEGABANK", "ZOO.COM" as shown in FIGS. 10, 11 and 13 respectively.

Email Table 418 allows the offeror and/or issuer to provide the cardholder with an anonymous e-mail address so that, as part of a transaction, the cardholder can provide an e-mail address without revealing their identity. Of course it will be recognized that providing this service reduces the anonymity because the offeror/issuer will maintain a link to the cardholder's actual e-mail address. Nonetheless, the transaction would still be anonymous to the merchant from whom the cardholder makes the purchase.

The Options table 420 contains further links to other tables implementing various options available to the offeror/issuer and/or cardholder.

Figure 18:
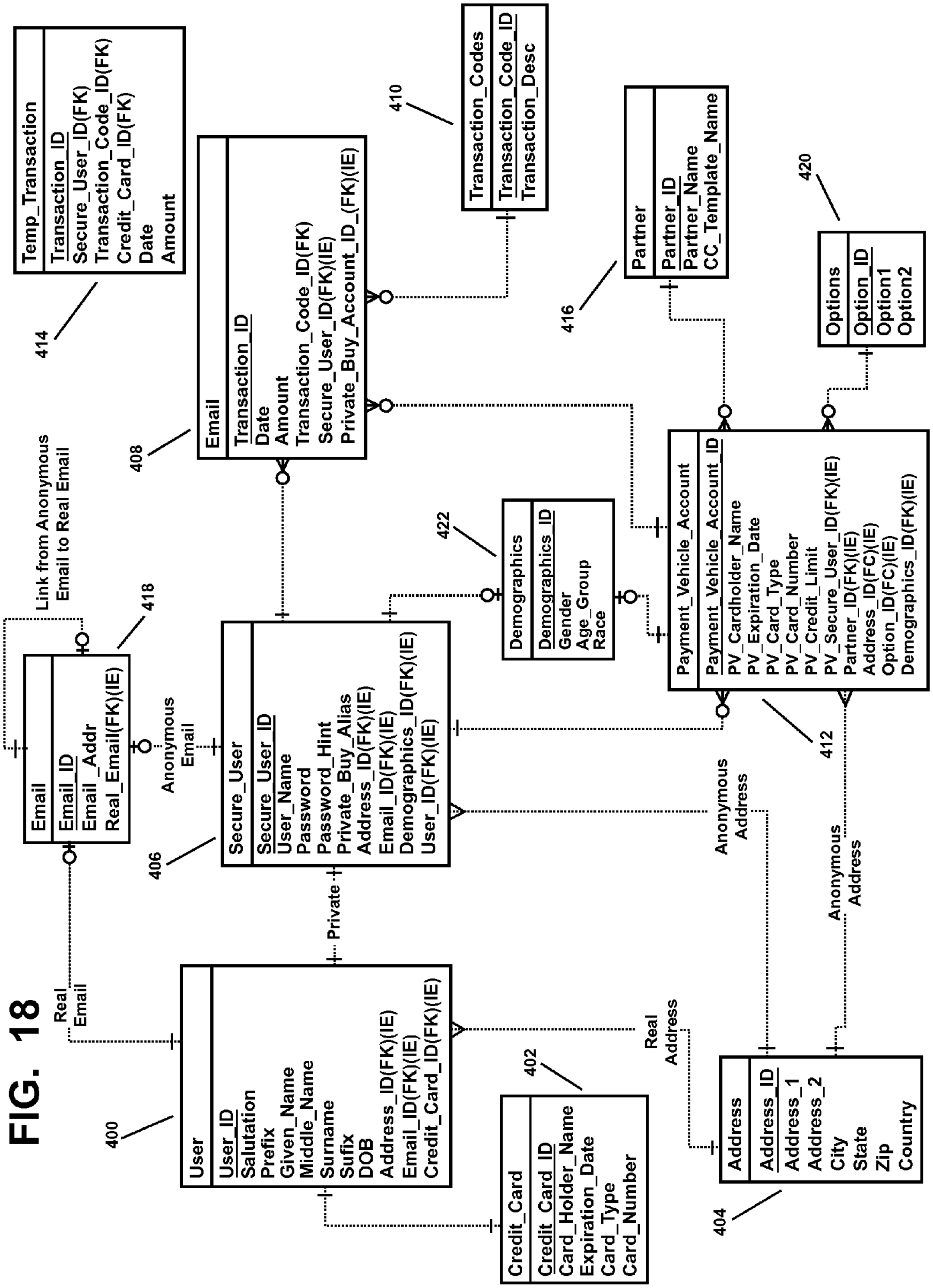
FIG. 18 is an ERD diagram for another example database for use with the invention.

FIG. 18 is yet another variant on the ERD diagrams for the database 302. FIG. 18 is similar to FIGS. 16 and 17 except that it adds another optional Demographics table 422 which allows the issuer to maintain demographics about for example, the cardholder and their purchase history and/or preferences, online usage, etc.

Purchase Process

With continuing reference back to the system of FIG. 14, the purchase of a financial services card proceeds as follows. A prospective cardholder/purchaser 316 connects to the interface 304 provided by the offeror 300, for example, using a personal computer 322 connected to the internet 306, by entering on a web browser program a URL for the site, the Internet Protocol (IP) address or by following a hyperlink. The prospective purchaser 316 sees displayed on the screen descriptive information relating to the financial services card account. For example, the descriptive information may include material extolling the benefits of the financial services card account, such as limited or total anonymity, describing what a purchase entails, and/or any fees which may be incurred by the purchaser should they become a cardholder. Once the prospective purchaser 316 decides to purchase a financial services card and become a cardholder, they indicate this intention by clicking on a link which will change the display to a purchase form. Although not necessary for the invention, for security reasons, it is desirable at this point to establish a secure communication connection between the browser running on the purchaser's computer 322 and the offeror 300, using one of the many secure protocols available.

The form allows the purchaser 316 to provide a formal request to the offeror 300 by providing such information as the purchaser's name, address and payment information (i.e. the payment being used to pay for the financial services card the account). The form is designed, for example, to accept any of three different forms of payment: debit/credit/charge card; electronic money (e-money); or direct payment from a bank checking account. Of course, other forms of payment, such as electronic checks, wire transfer, etc., may be accepted as well as, or in lieu of any or all of those three. The purchaser 316 also provides the part of the name they wish to appear on the card as their part of the selection and the denomination or amount.

Advantageously, since the purchaser is paying in advance the denomination or amount may be any amount specified by the purchaser 316 although, in some embodiments, for administrative reasons, it may be desirable to require a minimum amount, a maximum limit, or suggest specific predetermined or standard amounts. Thus, it may be desirable to require a minimum value of twenty-five ($25) dollars and/or provide standard value increments of five ($5), ten ($10) or twenty-five ($25) dollars.

In addition to the amount paid which will be the allowable value on the financial services card account, a prospective purchaser will likely be assessed a fee. Depending upon the embodiment, different fee arrangements may be used and, being well known and unnecessary for understanding the invention, are not discussed herein.

As a further advantage, to protect against loss the purchaser 316 may also be requested to include a password and possibly a password "hint" which will be associated with the financial services card account database entry. Thus, in the event the purchaser 316 contacts the offeror 300 seeking replacement of a lost card, even though the card has been made partly or wholly anonymous, the cardholder 316 can uniquely identify themselves to the offeror 300.

Once the purchase form is complete, the purchaser clicks on an icon which sends the form contents to the offeror. The information is extracted from the form.

In the embodiment of FIG. 14, where the payment gateway 314 is the CyberCash system for authorization/clearance of the payment, if the purchaser 316 has paid using a debit/credit/charge card, for example, a MasterCard or, VISA authorization will be obtained in the conventional manner through the CyberCash system 314. Where the offeror 300 is connected to the MasterCard or Visa card association that authorization infrastructure may alternatively be used. Similarly, if alternative payments schemes are acceptable, the authorization/clearance infrastructure associated with those schemes will accordingly be used. Of course, if available, the purchaser may purchase off line, for example, by paying by check or money order.

At or about the time of payment, a financial services card account number is either allocated or obtained from the issuing bank 311 and is added as a record or causes an update to a record in the database 302. The appropriate database 302 fields are then populated in accordance with particular information received.

Registration Process

As noted above, the purchaser 316 selects only a part of what will be the cardholder name. Although the purchaser may provide their legal name and address as part of paying, that information is merely used to obtain authorization for payment, for example if payment is made using an American Express, Visa or MasterCard.

The purchasers payment is used to fund a demand deposit account which is generic to the issuer/offeror (i.e. funds paid by multiple purchasers are commingled in the account). The DDA account is used to pay all charges to the financial services cards which have been issued and are active.

Once authorization (or payment) is received, the issuer/offeror requests a card be manufactured which has, or will be coded with, one of the account numbers an expiration date or validity range, the name selected by the purchaser as if it was the first name on a prior art debit/charge/credit card, and an issuer selected string of characters, preferably an issuer associated word, as if it was the surname on a prior art debit/charge/credit card. The card is then made and/or coded with the information and ultimately delivered to the purchaser.

The authorization also triggers registration of the account in a cardholder name that is constructed by utilizing the part selected by the purchaser as a "first" name, and the part associated with the issuer as the surname. This constructed cardholder name is stored in the record for the account number assigned. Other additional database fields for the account record, if any, may also be entered at this time, if they have not already been entered. Alternatively, they may be filled in at some later point, for example, at activation time.

Also, preferably, the actual name and address of the purchaser are used solely for authorization at the time of purchase and for delivery of the card. Once those requirements are met, all identifying purchaser information is preferably discarded. Most desirably, that information is not correlatable with the database record or its contents once the purchaser 316 becomes a cardholder. Thus, in this embodiment, from the time of registration and thereafter, there will be no way to associate the card with any particular person. Furthermore, the degree of anonymity will thereafter solely depend upon the part of the name selected by the purchaser or their actions. For example, if the purchaser selected the name "tallman" because he had an e-mail account with Zoo Mail Co. of "tallmangzoo.com" the anonymity would be preserved only to the extent someone could not obtain further information via the e-mail address itself. Similarly, John Smith, with a Zoo Mail Co. e-mail address of "jxs43@zoo.com" would be totally anonymous if he randomly selected a sequence of characters or a name bearing no identifiable relationship to John Smith such as "wilber7" as his part of the cardholder name on the account.

If the account issuance procedure activates the account upon entry into the database, the last entry in the sequence will be the account activation triggering information.

If the account issuance procedure is such that mere entry of the information into the database does not indicate activation, a flag in the database record will be set in accordance with the activation protocol when sufficient information is stored or provided such that the activation criteria are satisfied. At this point the account is considered registered.

When the account is registered, if a physical card is desired, the issuer 300 has a physical card created according to known practice, for example, in one of the types described above. The cardholder name as it is registered in the database 302 is added onto, or into, to the card and readied for ultimate delivery to the cardholder. In accordance with normal financial services card delivery practices for example, the card is then delivered to the cardholder. Depending upon the issuer, the cardholder may be required to perform some action before the card may be activated for use. This may consist of, for example, making a telephone call and providing certain information, going to a website and doing the same, appearing in person at a branch of the issuing bank, or sending a reply card to a designated address.

Additionally, the billing information is preferably specified such that settlement of charges to the card come from the DDA account. Alternatively, the billing information may be set up so that a statement for the account is sent to the seller of the inventive financial services cards for payment. In any event, while there may be numerous ways for billing to be handled, an important aspect in any of the anonymous cases, is that there is no way to get the statement to the cardholder but, advantageously, there is no need to do so because funds to satisfy the bill have already been collected from the cardholder at or about the time the card was purchased.

Activation Process

The activation process readies the account for use. Depending upon the particular embodiment, activation may occur at or near the time of purchase, on some future designated date, or following some action by the purchaser on receipt of the card. In general, activation will be accomplished by, for example, setting the active flag indication in the database for the account record and notifying the issuing bank of the cardholder name registered on the account. This will likely occur upon receipt of some indication from the purchaser that the card has been received, for example by the purchaser sending an e-mail or making a telephone call to a specified number. The important aspect of activation is that all the appropriate information is conveyed, in accordance with the issuing bank's requirements, so that the financial services card account may be used.

Merchant Acceptance/Authorization

After issuance, receipt and, if necessary, activation, the card is used to make purchases of goods and/or services like a prior art financial services card, except that when a purchase is made, the name which is used for the purchase is the name associated with the account. In other words, for the card of FIG. 13, when read, the name would be given as, for example, "IANSANIMALS ZOO.COM" instead of the cardholder's legal name. The merchant processes the purchase in the same manner as they would for debit/credit/charge cards.

Clearance/Settlement

Clearance and/or settlement of a purchase using the inventive financial services card occurs in the same manner as is used to clear other analogous prior art card accounts. From the perspective of the merchant, the charge is processed, and funds are received, in the normal manner using the merchant's acquiring bank, through the normal cardholder association clearance/settlement process. From the perspective of the issuing bank, actual funds for settlement with the acquiring bank will typically come from a demand deposit account (DDA) set up by or for the issuer.

Although the issuer could set up separate accounts for storage of funds for each financial services card account, administratively it is more desirable and advantageous to maintain as few accounts as possible for clearance/settlement purposes. Ideally, since all monies backing the active financial services card accounts can be commingled and require no traceability to a particular account, a single master DDA account can be used, with the database records providing the link between the available balance on a particular financial services card account after usage and the DDA account.

Alternatively, if different types of accounts are used, a separate account could be maintained for each different type of financial services card account. For example, one DDA account for debit type financial services cards (where balances are decreased upon usage by the amount charged) and another for credit/charge type accounts (where the "credit limit" is reduced by the amount charged).

Thus, following activation, the link between issuer and cardholder will largely not, if at all, exist. For purposes of settlement and/or clearance since, in most instances, the purchaser will have, in effect, settled the maximum amount of his total allowable transactions with the financial services card with the issuer prior first to using the financial services card with a merchant.

Figure 19:
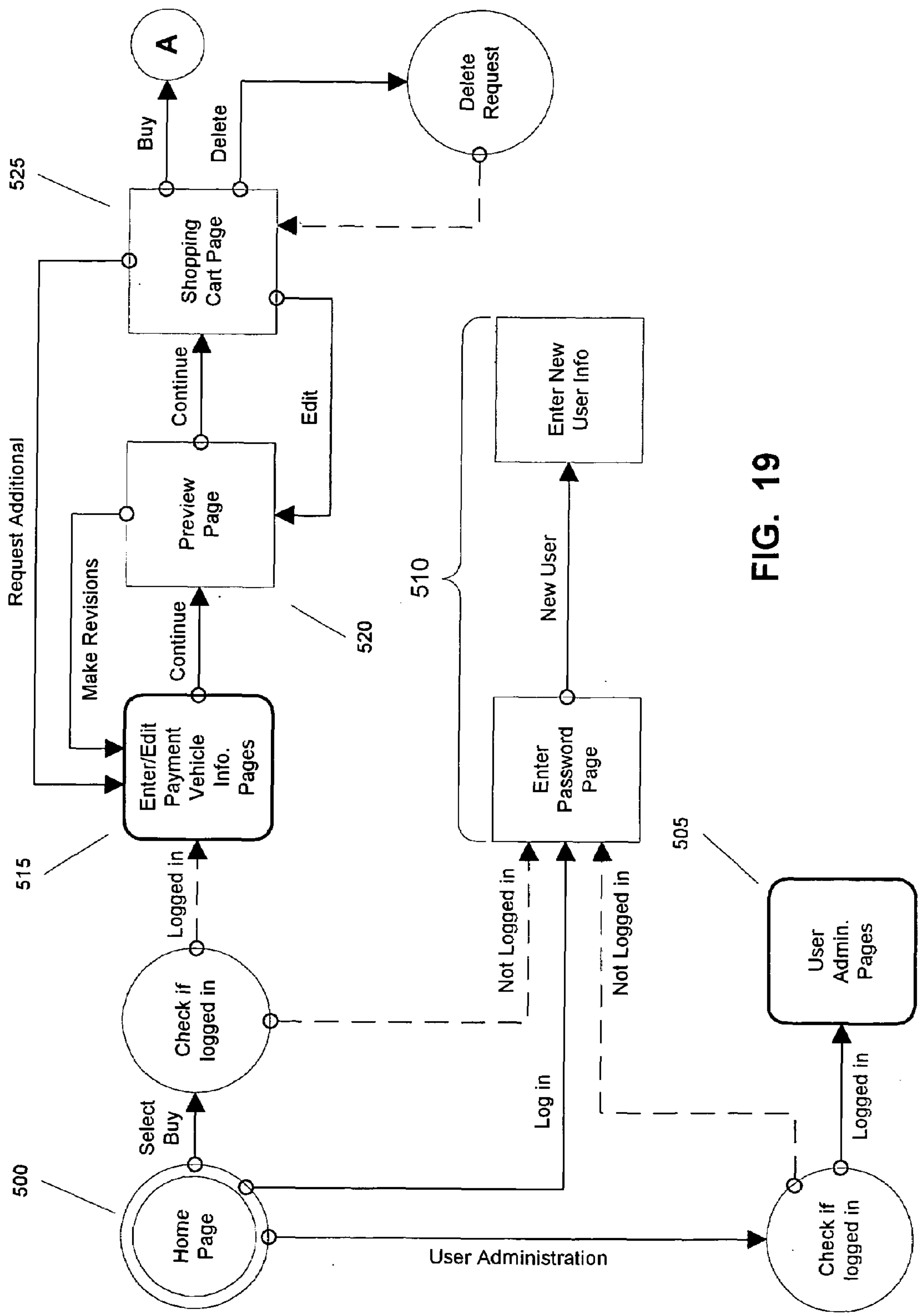
FIGS. 19 and 20 are UML state transition diagrams.
Figure 20:
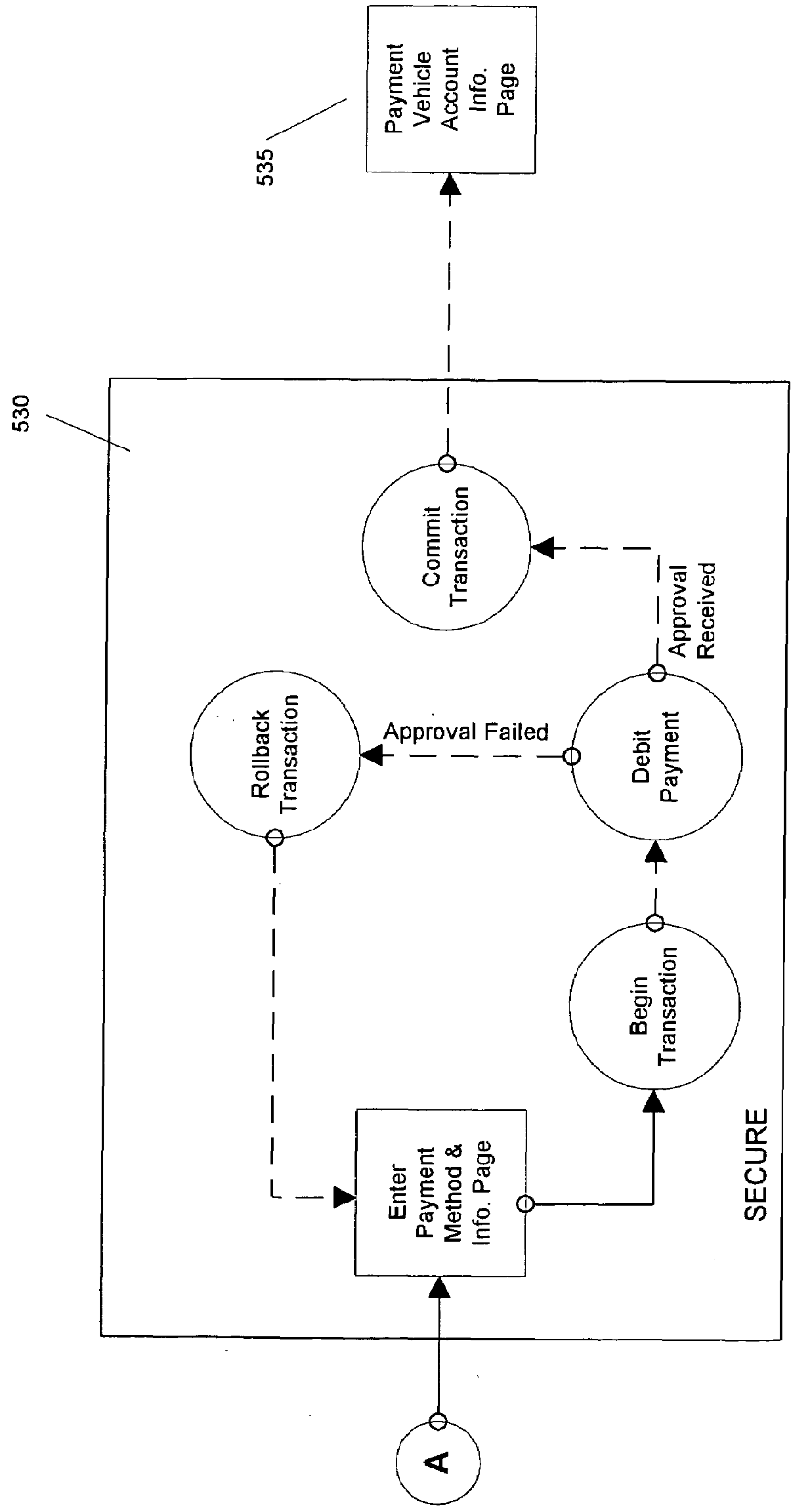

FIGS. 19 and 20 show state diagrams in the Uniform Modeling Language (UML) as developed by Rational Software Corp. (also known to those in the art as UML drawings). The state diagrams illustrate state transitions for another example embodiment operating on the internet in accordance with the invention, as considered from the perspective of the issuer. The prospective cardholder starts out at the offeror's home page 500. The home page 500 includes the ability to request a payment vehicle account and the option of having a corresponding physical card for the account issued, log in to check account information, or create/change log in information. If the prospective cardholder is actually already a cardholder, they can log in and connect to the User Administration page(s) 505. The User Administration Page(s) 505 allow a cardholder, for example, to see account balance, change information such as forwarding e-mail address, contact customer service regarding a problem with the account, and/or change their password used to log in.

If the prospective cardholder has just become a cardholder, they can begin a new user log in procedure 510 which sets up the ability to access the User Administration Page(s) or other parts of the website securely.

If the prospective cardholder is not yet a cardholder, but has completed the new user log in procedure 510 they are able to log in and are then directed to the Payment Vehicle Information Page(s) 515. These pages allow for the input of the necessary information to allow the opening of a payment vehicle account for that person, such as: provision of payment according to one of the methods accepted by the offeror, selection of one part of the cardholder name, provision of an address for delivery of a physical card for the account should one be requested, etc. Once the information is submitted, the information provided and an image of the physical card, if requested, as it will be made appears on a Preview page 520. If accepted, the request is compiled in a Shopping Cart Page 525. If revisions need to be made, a rejection of the preview returns to the Payment Vehicle Information Page(s) 515.

The Shopping Cart page 520 is particularly useful to persons desiring to create, in effect, single use cards. If the prospective cardholder has a particular purchase (or group of purchases) in mind of a known amount, but wishes to be sure that the card can not later be charged by an unscrupulous merchant, an account for each exact amount can be opened, thereby limiting the amount that can be charged to the exact amount desired, and no more.

From the Shopping Cart page 525 the prospective cardholder has the option of changing their mind and deleting the request or entering a preferably secure area 530 in which the prospective cardholder pays for the payment vehicle account(s) desired. If the payment is accepted, the prospective cardholder is sent to the Payment Vehicle Account Information Page 535 which displays the appropriate information regarding each payment vehicle account and any cards requested. If the payment is rejected, the provided payment information is discarded and new payment information is requested.

It is contemplated that, given the different types of cards which are or may become available, by reading the disclosure herein, it will no doubt become apparent to those of skill in the art that certain modifications or alterations of the present invention may be made to accommodate those cards. Similarly, it should be understood that, while the cardholder name has been described as being constructed from a part selected by the purchaser of the financial services card and a part by someone other than the purchaser who, in more preferred embodiments, is the issuer or their agent, no specific arrangement of the names should be inferred. In other words, in some embodiments, the part selected by the purchaser could be used in place of the surname and the part selected by the issuer could be used in place of the first name. Alternatively, the purchaser selected part and the non-purchaser selected part could be split up so that a portion of each is used to construct the surrogates for the first name, and the same is done for the surname.

Figure 21:
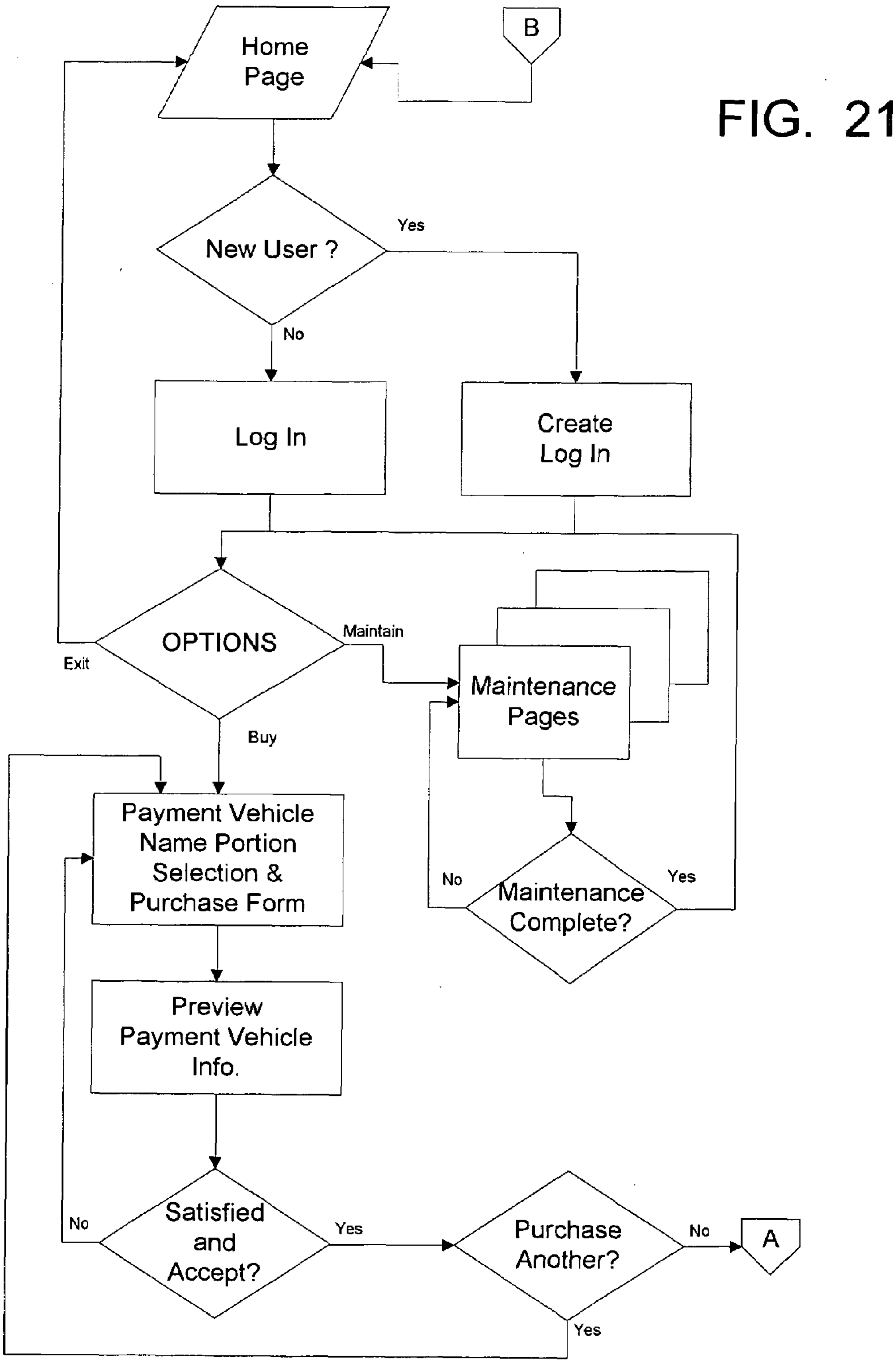
FIGS. 21 and 22 are a flowchart correlating to the UML diagrams of FIGS. 19 and 20.
Figure 22:
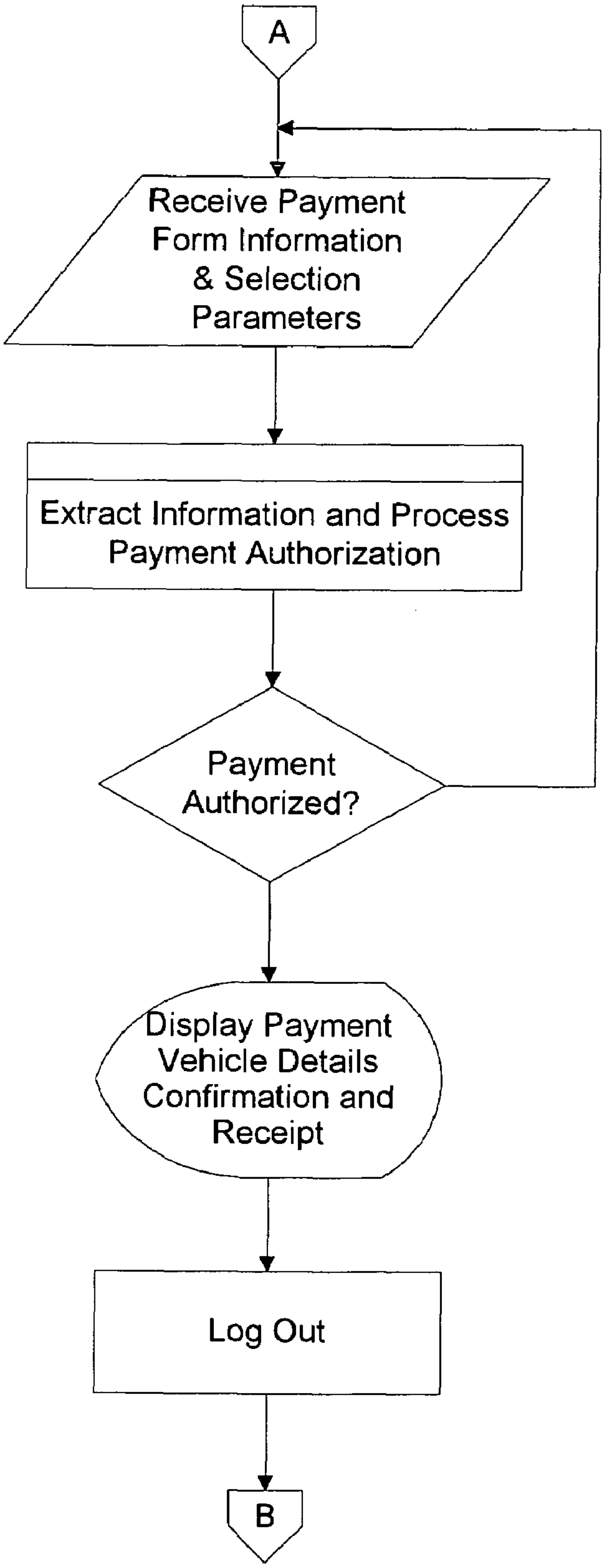

FIGS. 21 and 22 are a flowchart corresponding to the UML diagrams of FIGS. 19 and 20. For illustrative purposes, an example set of transactions, involving purchase and use of example financial services card accounts is provided.

In the first example, the financial services card has limited to no anonymity and is issued through a co-branding arrangement with a major university, Maine A&M. In this embodiment, the issuer therefore is the entity that maintains the database 302 for the financial services card accounts.

The issuer acquires a group of debit, charge and/or credit type card accounts, in this case debit cards from MasterCard, via an issuing bank. The issuing bank registers the accounts in the name of the issuer for record keeping purposes and sets the value for the card to zero. The issuer offers the cards to alumni, faculty, students and administration personnel at the university through a targeted mailing. An alumnus, Calvin Warmledge, decides to get one of the cards and sends a check for $1010, $1000 of which will be the available balance, $10 being the administrative fee. As part of the order form, Mr. Warmledge selects the first part of the name to be CALWARM. The form also allows him to direct the part of the school to which a part of the administrative fee will be paid by opting for one of two second parts of the name selected by the University: FRUITBATS (which is the University mascot) or MEMA (which is the University Nickname). He additionally includes his mailing address, so the card can be sent to him and a code word which will be used for activation purposes.

When the issuer receives the order form and check, it deposits the check into a DDA account which is used to settle purchases made using the issued Maine A&M financial services cards. The issuer maintains other similar DDA accounts, one for each co-branding university partner.

One of the acquired account numbers is added to a record in the database, the active flag in the record is set to inactive, the activation code word is entered and the value of the account is set to $1000. The mailing address is noted in a file which is separate from the database along with the account number.

The issuer has a financial services card created which includes as a background on the face of the card, the University seal and contains the cardholder name "CALWARM FRUITBATS". The card is sent to the cardholder's mailing address along with activation instructions.

When he receives the card, Mr. Warmledge follows the instructions provided and calls a telephone number provided with the card and enters his account number via the touch tone keypad on the phone. The account number is used to locate the database record and obtain the activation code word. An operator comes on and asks Mr. Warmledge for his code word. The operator compares the code word provided over the phone to the database entry and, since they match, tells the system to activate the card. The system then sets the flag in the account record to indicate that the card is active and Mr. Warmledge is told that the card is now active.

Later, while thumbing through the Fitch Bros. catalog, Mr. Warmledge sees a tweed jacket that he decides to order. The total for the order comes to $250. Mr. Warmledge fills out the catalog order form with the appropriate information since he is not concerned with anonymity, he enters his mailing address on the form. In the spaces related to payment, he checks the box indicating payment by MasterCard debit card, enters the account number from his card in the space provided and his name as Calwarm Fruitbat. He also signs the form Calwarm Fruitbat in the signature space on the form. He then mails the form.

An order fulfillment house operating on behalf of Fitch Bros. receives the order and processes it in the usual manner although there has been no physical presentation of the card at or about the time Fitch Bros. seeks authorization for a $250 payment by Calwarm Fruitbat. Furthermore, at or about the time Fitch Bros. seeks authorization, it will not be able to determine if a physical card has ever issued for the account. Nonetheless, the conventional authorization and clearance infrastructures causes a debit of the DDA account set up by the issuer in the amount of $250 and the issuer, noting the charge, decreases the available amount in the database record for the account by $250, thereby changing the available amount to $750 in the database record.

In a few days, he receives his order addressed to Calwarm Fruitbat.

In the next example, the financial services card has limited anonymity and is issued by an issuing bank, Mega Bank through its online commerce subsidiary MegaCorp. which maintains the database 302 for the financial services card accounts.

MegaCorp. has a website, which is accessed via the internet, as the sole means through which the MegaBank financial services card can be obtained. The card and its advantages are advertised however, through cooperative agreements with other website providers who maintain a link to the MegaCorp. website on one or more of their home pages.

A prospective purchaser connects to the MegaCorp. home page which provides some basic explanation of the limited anonymity financial services card. In this embodiment, the anonymity is limited because the purchaser name is used solely to obtain authorization for payment and then discarded however, the mailing address information, which may be a post office box, is maintained as part of a database record although the issuer will not use that address except for sending the card.

The purchaser fills in an online form with his name, mailing address, the amount (in this case $200) and payment information. The purchaser is also directed to select a name, which will appear as a cardholder "first name" on the card. The purchaser is also informed that the "surname" on the card will be MegaBank.

The purchaser selects the name to match his vanity license plate "LIV2SKI". When the form has been fully filled out, he clicks the send button. The payment information is extracted along with the purchaser's actual name and payment authorization is sought. Upon receipt of an authorization code, the issuer discards the actual name and payment information and enters the remaining information into a database record. Once payment authorization is obtained, the issuer then requests and obtains a financial services account number from the issuing bank via a dedicated connection to the issuing bank. The financial services accounts in this example are credit type accounts. Thus, the database record indicted an available credit limit of $200. When credit type card accounts are used, the credit limit is decreased by the amount of each usage, until the credit limit for the card is "used up", at which time the account is marked inactive.

When an account number is received, it is entered into the database record and a financial services card for a cardholder named "LIV2SKI MEGABANK" is created.

The cardholder receives the card which, in this case is a VISA credit card, bearing the cardholder name "LIV2SKI MEGABANK" and also contains in a two dimensional barcode on the reverse side of the card underneath a hologram of the MegaBank logo.

This cardholder activates his financial services card account by going to a secure website and entering his street address and account number in an online activation form. The entered information is compared to the information in the database record for the account and the account is indicated as active.

In the last example, the financial services card has complete anonymity and is again issued by issuing bank, Mega Bank through its online commerce subsidiary MegaCorp. which maintains the database 302 for the financial services card accounts. In this example, the procedure is the same as in the previous example, except no identifying information is stored in the database 302 other than a hash number which may be used as a pointer into a separate file containing the mailing address. Furthermore, the cardholder selection bears no identifiable relation to the cardholder in that it is merely a sequence of intermixed letters and numbers of the maximum length allowed.

A card is made, bearing the purchaser selection as the first name and "MEGABANK" as the surname. The card is made and provided to the issuer for ultimate delivery to the purchaser. The issuer then uses the account number to obtain the hash number and uses the hash number to identify the mailing address. Once the mailing address is used to send the card, both the mailing address in the file and the hash number in the database record are purged, thereby severing any connection between the purchaser and actual cardholder identifying information. Upon receipt of the card, the cardholder activates the card, for example, by making a phone call or going to a website and provides the account number and a code word provided in the original online purchase form. If they match the database entry, the card is activated and the cardholder may use the card with complete anonymity from the card perspective if, for example, the card is used for an online purchase of a pay-per-view movie. Of course, the anonymity may be partially or completely destroyed based upon other information which may be provided by the cardholder such as their home address for delivery of goods, or information required by the merchant, such as corroborating identification.

Cardless Embodiments

Although the invention has been described largely with respect to embodiments which include a physical card, it will also be recognized from the above that the invention may straightforwardly be applied to cardless arrangements and methods for simplicity, the term "cardholder" is still used with respect to the cardless embodiment, since the selection of the two parts will be analogous, the major difference being that a physical card is not provided to the cardholder for presentment. Of course, it is contemplated that cardless embodiments may readily be converted to carded embodiments through the later provisions of a physical card as described herein. For example, commonly assigned application entitled "Transfer Instrument", incorporated herein by reference, describes a payment invention in which no physical card is issued for the payment card account and provided to the user at, or prior, to the time when the user makes a purchase under the payment card account. The invention described herein may be straightforwardly used in the novel Transfer Instrument context using one of the databases described therein in conjunction with one of the databases described herein or by implementing a combined database containing the relevant portions of each. As a result, usage of the invention described herein is accomplished, from the user perspective, by the giving the recipient a specific option of "anonymizing" the name necessary for use of the Transfer Instrument. The anonymization is accomplished by having the designated recipient select only a first part of the cardholder name. As described above, the second part, typically although not necessarily specifically substituting for the surname on a conventional debit, charge or credit card, being selected by some entity unrelated at least to the recipient (i.e. the issuer, sponsor, co-brander, or some other applicable unrelated third party). It should be noted that, in this context, that if the card account is a co-branded type, the invention would allow for the second part to be selected by the issuer or the co-branding entity or some other third party authorized entity, subject to the exclusions noted herein.

The database entry would then be created with the recipient's selection as one part of the cardholder name and the unrelated party's selection as the other part of the cardholder name. Preferably, the file entry that is correlated to the database, as described herein, is used to track the identity of the recipient up until such time as the Transfer Instrument becomes active, at which time the file entry which would reveal the identity of the recipient would be purged, thereby providing the desired level of anonymity deriving from the selected name and ultimate usage.

In this description we have shown and described a number of preferred embodiments of the invention, it being understood that the invention is capable of use in various other combinations, environments or applications which will be apparent as subject to straightforward implementation to those of skill in the art in light of the description. Similarly, it will be recognized that aspects of the invention are implemented by programming. Thus, reordering of steps, substitution of hardware components for software compatibility or speed, or variations created due to differences in programming languages and/or styles or other modifications are considered to be within the scope and spirit of the inventive concepts expressed herein. Accordingly, we intend for our invention to be defined and limited solely as set forth in the claims.

What is claimed is:

1. A method comprising:

a) receiving a request for a financial services account of a plurality of financial services accounts capable of being evidenced by financial services cards, b) accepting a selection of a first sequence of characters from a person making the request, c) selecting a second sequence of characters which identify an entity unrelated to the person, d) combining the first sequence of characters and the second sequence of characters into a cardholder name, e) storing the cardholder name into a database record including an identifier of a financial services account and an available amount, f) accepting a payment for an activation of the financial services account, g) creating a financial services card for the financial services account, the financial services card including the cardholder name, h) providing for delivery of the financial services card to the person, i) activating the financial services account, j) providing an anonymizing capability for the financial services account, k) depositing the payment into a DDA account, l) setting a transaction, between the person and a merchant who accepted the financial services card, out of the DDA account, and m) decreasing the available amount by an amount of the transaction.

2. The method of claim 1 wherein at least one of b), c) and d) occur before a).

3. The method of claim 1 wherein f) occurs before b).

4. The method of claim 1 wherein j) occurs at least at a time prior to any of g), h) i), k), l) and m).

5. The method of claim 1 further comprising anonymizing the financial services account by purging identifying information for the person.

6. An apparatus comprising:

a financial services card including i) an account identifier; and ii) a name, the name having a first part and a second part, the first part being selected by a cardholder of the financial services card, the second part being selected by an issuer of the financial services card, the name representing a cardholder name in which a financial services card account identified by the account identifier is registered.

7. The apparatus of claim 6 wherein the financial services card account has a value.

8. The apparatus of claim 7 wherein the value is a credit limit.

9. The apparatus of claim 7 wherein the value includes a monetary amount at least as great as a backing payment made by the cardholder.

10. The apparatus of claim 6 wherein the financial services card account is maintained in a database which contains no record of an actual identity of the cardholder.

11. The apparatus of claim 6 wherein the name appears on the financial services card in a human readable form.

12. The apparatus of claim 6 wherein the name is contained on a magnetic stripe affixed to the financial services card.

13. The apparatus of claim 6 wherein the name is contained in a circuit affixed to the financial services card.

14. The apparatus of claim 6 wherein the name is contained on the financial services card in a coded form.

15. The apparatus of claim 14 wherein the coded form is a barcode.

16. The apparatus of claim 15 wherein the barcode is a two dimensional barcode.

17. The apparatus of claim 6 wherein the second part is a proxy for a surname.

18. The apparatus of claim 6 wherein the first part includes alphabetic and numeric characters.

19. An apparatus comprising:

a financial services card including i) an account identifier; and ii) a name, the name having a first part and a second part, the first part being selected by a first party, the second part being selected by a second party different from the first party, neither the first or second party being related to a cardholder who will be provided with the financial services card for the cardholder's use, the name representing a cardholder name in which a financial services card account identified by the account identifier is registered, the financial services card further having an associated billing identifier which will result in a settlement of a charge by the cardholder using the financial services card from an account associated with the first or the second party and the cardholder name neither being a given name nor a stage name of the cardholder.

20. An apparatus comprising:

a financial services card account including an associated cardholder name, an account limit, a billing address and an expiration indicator, the expiration indicator representing a date on which a financial services account card for the financial services card account will not be usable, the billing address being associated with an issuer of the financial services card, the cardholder name having a first part representing a selection by a cardholder having an actual name and a second part representing a selection by an entity other than the cardholder having an association with the issuer of the financial services account, the second part being usable as a surrogate surname of the cardholder, so that when the cardholder makes a purchase and pays a merchant for the purchase via the financial services card account, the cardholder will use the cardholder name instead of the actual name and a payment for the purchase will be made without identifying the actual name of the cardholder.

21. The apparatus of claim 20 further comprising:

means for storing records, the records containing information related to the financial services card account, the means, at a time of the purchase, containing no information capable of identifying the actual name of the cardholder.

22. The apparatus of claim 20 further comprising:

a database which stores information related to the financial services card account, the database, at a time of the purchase, containing no indication of an address for the cardholder.

23. The apparatus of claim 21 wherein the means for storing contains no indication of an address for the cardholder.

24. An apparatus comprising:

a database stored on a computer readable media, the database including records associated with a plurality of active financial services card accounts, one of the financial services card account records having a name representing a cardholder for purposes of using the account, the name having a first part selected by the cardholder and a second part selected by a second party unrelated to the cardholder.

25. The apparatus of claim 24 further comprising:

a pointer associated with an active database record.

26. The apparatus of claim 25 wherein the pointer identifies a settlement source.

27. The apparatus of claim 25 wherein the pointer identifies a settlement account.

28. The apparatus of claim 27 wherein the settlement account is a DDA account.

29. The apparatus of claim 25 wherein the pointer identifies a billing address.

30. The apparatus of claim 24 wherein the billing address identifies an issuing bank for a financial services card representing the financial services card account, the card incorporating the first part and the second part.

31. The apparatus of claim 24 wherein an active financial services card account is anonymous.

32. The apparatus of claim 31 wherein the anonymity is limited.

33. The apparatus of claim 31 wherein the anonymity is complete.

34. The apparatus of claim 24 wherein the second party is one of an issuer of debit cards, an issuer of credit cards, an issuer of charge cards, an operator of the database, an agent of an issuer, a bank, a savings and loan, a payment card association, an authorized representative of an issuer, a provider of ATM cards, a brokerage, or an entity that makes payment cards available to its customers.

35. A method comprising:

adding a cardholder name to a financial services card, the cardholder name comprising at least two parts, a first part being an identifier selected by a cardholder who will receive the financial services card and a second part being characters selected by an entity other than the cardholder the first and second parts together substituting for an actual name of the cardholder; and providing the financial services card containing the cardholder name for ultimate delivery to the cardholder.

36. The method of claim 35 wherein the adding comprises imprinting the cardholder name in human readable form.

37. The method of claim 36 wherein the imprinting comprises rendering the cardholder name in ink on a surface of the card.

38. The method of claim 36 wherein the imprinting comprises one of raising or lowering characters relative to a surface of the card.

39. A method of administering financial services card accounts comprising:

registering a financial services account in a cardholder name, the cardholder name comprising a first part, related to the cardholder, and a second part, identifying a party unrelated to the cardholder.

40. The method of claim 39 further comprising anonymizing the financial services account.

41. The method of claim 39 further comprising communicating the cardholder name to an issuing bank for the financial services account.

42. The method of claim 39 further comprising activating the financial services account.

43. The method of claim 42 wherein the activating includes adding a record for the financial services account into a database.

44. The method of claim 39 further comprising causing creation of a financial services card having the cardholder name.

45. A method comprising the steps performing the functions of:

a using step for making a purchase with a financial services card, the financial services card including a cardholder name having a first part selected in a first selecting step by an individual in whose name the financial services card is registered, and a second part selected in a second selecting step, the second part identifying an entity other than the individual.

46. The method of claim 45 further comprising, prior to the using step, the first selecting step occurs after the second selecting step.

47. The method of claim 45 further comprising, prior to the using step, backing the financial services card for initiating an activation of the financial services card.

48. The method of claim 47 wherein the backing step comprises paying for the financial services card using one of a debit card, a charge card, a credit card, electronic money, a precious metal, or a negotiable instrument.

49. A method comprising:

selecting a first part of a cardholder name for an account which would appear on a financial services card if a physical card is issued, accepting an unrelated entity's selection of a second part of the cardholder name for the account such that a use of the account will result in a provision of the first part in place of a first name and the second part in place of a surname.

50. The method of claim 49 further comprising the step of paying for a purchase using a physical financial services card.

51. The method of claim 49 wherein the first part is selected from an actual first name, an e-mail user name, a nickname and a sequence of alphanumeric characters.

52. A method comprising:

accepting a payment via a financial services card having a cardholder name made up of a first part, selected by a user of the financial services card, and a second part, selected by an entity unrelated to the user.

53. The method of claim 52 further comprising:

seeking authorization for the payment.

54. The method of claim 52 further comprising:

receiving an authorization code prior to performing the accepting step.

55. The method of claim 52 further comprising:

providing on-line services in exchange for the payment.

56. A transactional method comprising:

accepting a payment via a financial services card account having an account number and a cardholder name, the cardholder name including a first part, selected by a user of the financial services card account, and a second part, selected by an entity unrelated to the user without requiring a presentation of a physical card for the financial services card account at about a time when the accepting occurs.

57. The method of claim 56 further comprising the step of seeking authorization for a purchase using the account number for the financial services card account.

58. A method comprising:

tendering payment to a merchant by providing a financial services account number registered in a cardholder name representing a tenderor, the cardholder name made up of a first part, selected by the tenderor, and a second part, selected by an entity unrelated to the tenderor, the second part being present in place of a surname as the surname would appear on a conventional credit card issued to the tenderor.

59. The method of claim 58 wherein, at a time at or before tendering step is performed, no physical card has been issued in the cardholder name and provided to the tenderor for the financial services account.

60. The method of claim 58 wherein the tendering step further comprises presenting a physical card including the financial services account number and the cardholder name.

* * * * *